United States Patent

Brown

[11] 4,115,863
[45] Sep. 19, 1978

[54] DIGITAL STROKE DISPLAY WITH VECTOR, CIRCLE AND CHARACTER GENERATION CAPABILITY

[75] Inventor: Richard R. Brown, Phoenix, Ariz.

[73] Assignee: Sperry Rand Corporation, New York, N.Y.

[21] Appl. No.: 748,357

[22] Filed: Dec. 7, 1976

[51] Int. Cl.² .............................................. G06F 3/14
[52] U.S. Cl. ............................... 364/521; 340/324 A; 364/719; 364/720
[58] Field of Search ................... 235/151, 151.11, 152, 235/156, 186, 197, 198, 150.3, 150.31; 340/324 A, 324 AD

[56] References Cited

U.S. PATENT DOCUMENTS

| | | | |
|---|---|---|---|
| 3,629,841 | 12/1971 | Hare | 340/324 A X |
| 3,649,819 | 3/1972 | Waller | 235/151 |
| 3,713,134 | 1/1973 | Chaney | 340/324 A |
| 3,775,760 | 11/1973 | Strathman | 340/324 A |
| 3,789,200 | 1/1974 | Childress et al. | 235/198 X |
| 3,800,183 | 3/1974 | Halio et al. | 340/324 AD X |
| 3,809,868 | 5/1974 | Villalobos et al. | 235/151 |
| 3,828,169 | 8/1974 | Fluet | 235/150.31 |

*Primary Examiner*—Jerry Smith
*Attorney, Agent, or Firm*—Howard P. Terry; Albert B. Cooper

[57] ABSTRACT

The digital stroke display generates vectors by applying clock pulses to an up/down counter which through a digital-to-analog converter provides the deflection voltage for one of the display X or Y axes. The clock pulses are applied through a gate to a second up/down counter which through a second digital-to-analog converter provides the deflection voltage for the other of the X and Y axes. The gate is controlled by the overflow of an accumulator that is repetitively accumulating, under control of the clock pulses, a signal representative of the desired slope of the vector. Circular curves are generated by a concatanated series of vectors utilizing the vector generation apparatus where the signal representative of the vector slope is provided from a memory that stores the plurality of slopes for the concatanated vectors that comprise the circular curve. A signal representing the curvature of the circular curve is accumulated in a second accumulator, the outut of which provides the addresses for the slope memory. Characters are generated by the vector generation apparatus in response to a sequence of stored vector control words for writing a series of vectors comprising the desired character. Apparatus for display resolution enhancement is included wherein the digital-to-analog converter utilized in the display axis associated with the gated clock derives its input from both the associated up/down counter and the output of the associated accumulator.

49 Claims, 17 Drawing Figures

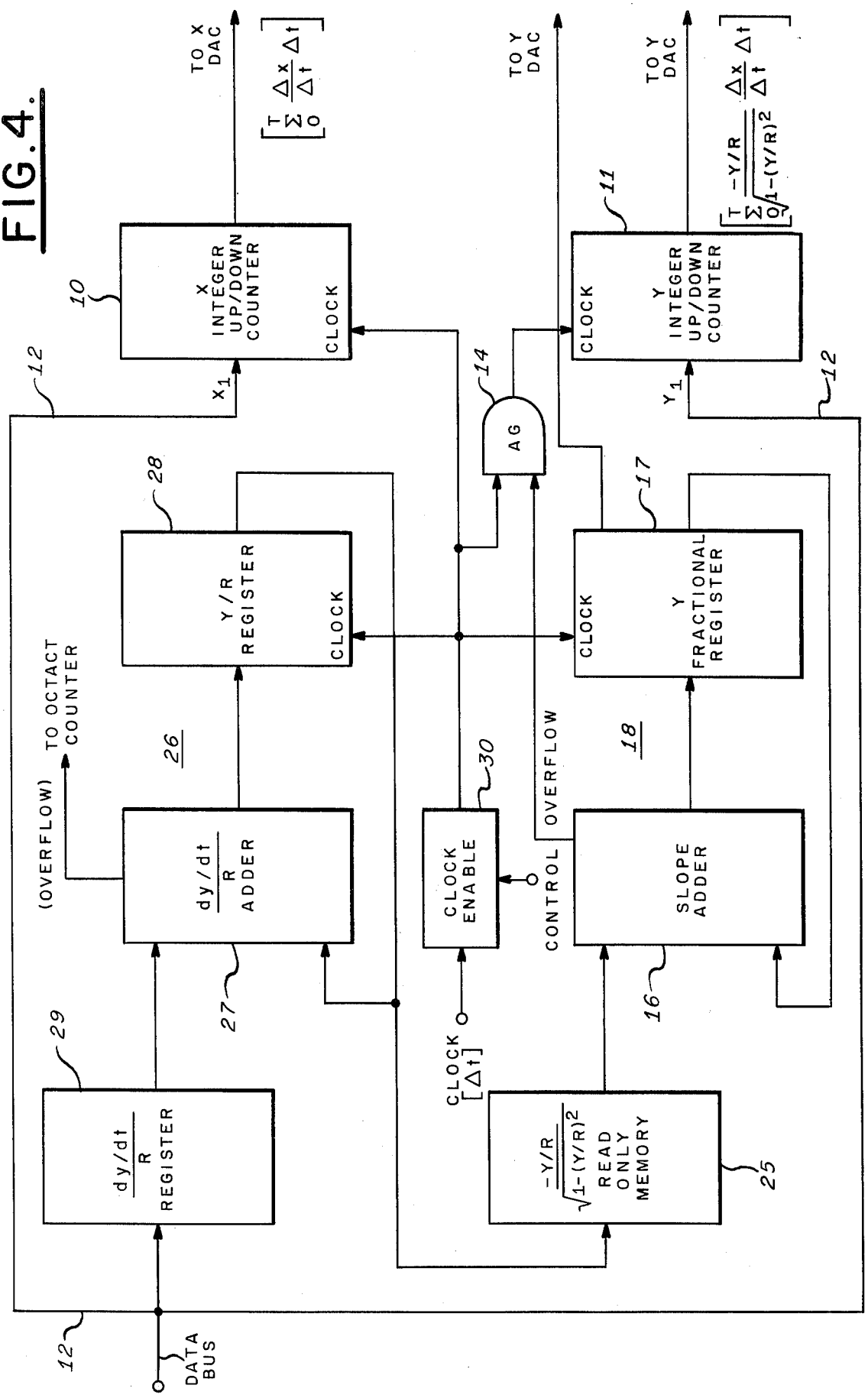

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|

INITIALIZE X POSITION: | FUNCTION CODE (FC) | X POSITION |

INITIALIZE Y POSITION: | FC | Y POSITION |

VECTOR: | FC | LENGTH |

| NOT USED | V | OCTANT | SLOPE |

SHORT VECTOR (CHARACTER MEMORY ONLY): | NOT USED | EOC | V | OCTANT | LENGTH | SLOPE |

CHARACTER: | FC | CHARACTER ADDRESS |

CIRCLE: | FC | CURVATURE = K/RADIUS |

END OF MESSAGE: | FC | NOT USED |

FIG. 6.

INTEGRATED DIGITAL STROKE DISPLAY
MICRO-CONTROLLER PROGRAM
MEMORY CONTENTS

FIG.10a.

| ADDRESS | DATA |
|---|---|

| Address \ Data | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|
| 0 | | 1 | | | | | | | | | | | | | | | | | | | | |
| 1 | | | | | | | | | | | | | | | | | | | 1 | 1 | | |
| 2 | | | | | | | | | | | | | | | | | | | | 1 | | |
| 3 | | | | | | | | | | | | | | | | | | | | | | |
| 4 | | | | | | | | | | | | | | | | | | | | | | |
| 5 | | | | | | | | | | | | | | | | | | | | 1 | | |
| 6 | | | | | | | | | | | | | | | | | | | | | | |
| 7 | | | | | | | | | | | | | | | | | | | | | | |
| 8 | | | | | | | | | | | | | | | | | | | | | | |
| 9 | | | | | | | | | | | | | | | | | | | | | | |
| 10 | | 1 | | | | | | | 1 | | | | | | | | | | | | | |
| 11 | | | | | | | | | | | | | | | | | | | | | | |
| 12 | | | | | | | | | | | | | | | | | | | | | | |
| 13 | | | | | | | | | | | | | | | | 1 | | | | | | |
| 14 | | | | | | | | | | | | | | | | | | | | | | |
| 15 | | | | | | | | | | | | | | | 1 | | | | | | | |
| 16 | | | | | | | | | | | | | | | | | | | | | | |
| 17 | | | | | | | | | | 1 | | | | | | | | | | | | |
| 18 | | | | | | | | | 1 | | | | | | | | | | | | | |
| 19 | | | | | | | | | | 1 | | 1 | | 1 | 1 | 1 | 1 | 1 | 1 | | 1 | |
| 20 | | | | | | | | | | | | | | | | | | 1 | 1 | 1 | | |
| 21 | | | | | | | | | | | | | | | | | | | | | | |
| 22 | | | | | | | | | | | | | | | | | | | | | | |
| 23 | | | | | | | | | | | | | | | | | | | | | | |
| 24 | | | | | | | | | | | | | | | | | | | | | | |
| 25 | | | | | | | | | | | | | | | | | | | | | | |
| 26 | | | | | | | | | | | | | | | | | | | | | | |
| 27 | | | | | | | | | | | | | | | | | 1 | 1 | 1 | 1 | | |
| 28 | | | | | | | | | | | | | | | | | | | | | | |
| 29 | | | | | | | | | | | | | | | | | | | | | | |
| 30 | | | | | | | | | | | | | | | | | | 1 | 1 | | | |
| 31 | | | | | | | | | | | | | | | | | | | | | | |
| 32 | | | | | | | | | | | | | | | | | | | 1 | | | |
| 33 | | | | | | | | | | | | | | | | | | | | | | |
| 34 | | | | | | | | | | | | | | | | | | | | | | |
| 35 | | | | | | | | | | | | | | | | | | | | | | |
| 36 | | | | | | | | | | | | | | | | | | | | | | |
| 37 | | | | | | | | 1 | | | | | | | | | | | 1 | | | |
| 38 | | | | | | | | | | | | | | | | | | | 1 | | | |
| 39 | | | | | | | | | | | | | | | | | | | 1 | | | |
| 40 | | | | | | 1 | 1 | | | | | | | | | | | | 1 | | 1 | |
| 41 | | 1 | | 1 | | 1 | | | | | | | | | | | | | | 1 | | |
| 42 | | 1 | | 1 | | 1 | | | | | | | | | | | | | | 1 | | 1 |
| 43 | | 1 | | 1 | | 1 | | | | | | | | | | | | | | 1 | 1 | 1 |

| ADDRESS \ DATA | 0 | | | | 5 | | | | | 10 | | | | | 15 | | | | | 20 | | | | | 25 | | | | | 30 | | | | | 35 | | | | | 40 | | | 43 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 41 | | | | | | | | | | | | | | | | | | | | | | | | | | | | | | | | | | | | | | | | | | | |
| 42 | | | | | | | | | | | | | | | | | | | | 1 | | | | | | | | | | | | | | | | | | | | | | | |
| 43 | | | | | | | | | | | | | | | | | | | | 1 | | | | | | | | | | | | | | | | | | | | | | | |
| 44 | | | | | | | | | | | | | | | | | | | | 1 | | | | | | | | | | | | | | | | | | | | | | | |
| 45 | | | | | | | | | | | | | | 1 | | | | | | | | | | | | | | | | 1 | | | | | | | | | | | | | |
| 46 | | | | | | | | | | | | | 1 | | | | | | | 1 | | | | | | | | | | 1 | | | | | 1 | | | | | | | | |
| 47 | | | | | | | | | | | 1 | | | | | | | | | 1 | | | | | 1 | | | | | 1 | | | | | 1 | | | | | | | | |
| 48 | | | | | | | | | | | | | | | | | | | | 1 | | | | | 1 | | | | | 1 | | | | | 1 | | | | | | | | |
| 49 | | | | | | | | | | | | | | | | | | | | | | | | | 1 | | | | | 1 | | | | | | | | | | | | | |
| 50 | | | | | | | | | | | | | | | | | | | | 1 | | | | | | | | | | 1 | | | | | 1 | | | | | | | | |
| 51 | | | | | | | | | | | | | | | | | | | | 1 | 1 | | | | 1 | | | | | 1 | 1 | | | | 1 | 1 | | | | | | | |
| 52 | | | 1 | | 1 | 1 | | | | | | | | | | | | | | 1 | 1 | | | | 1 | | | | | | | | | | | | | | | 1 | | 1 | |
| 53 | | | | | | 1 | | | | | | | | | | | | | | | 1 | 1 | | | | | | | | | | | | | | | | | 1 | | | | |
| 54 | | | | | | | | | | | | | | | | | | | | | | 1 | | | | | | | | | | | | | | | | | | 1 | | | |
| 55 | | | | | | | | | | | | | | | 1 | | | | | 1 | 1 | 1 | | | 1 | 1 | | | | 1 | 1 | | | | 1 | 1 | | | | | 1 | | |
| 56 | | | | | | | | | | | | | | | | | | | | | | | | | | | | | | | | | | | | | | | | 1 | | | |
| 57 | | | | | | | | | | | | | | | | | | | | | | | | | | | | | | | | | | | | | | | | | | | |
| 58 | 1 | | | 1 | 1 | 1 | | | | | | | | | 1 | | | | | | | | | | | | | | | | | | | | | | | | | | | 1 | 1 |
| 59 | | | 1 | | | 1 | | | | | | | | | | | | | | | | | | | | | | | | | | | | | | | | | | | | 1 | |
| 60 | | 1 | | | 1 | 1 | | | | | | | | | | | | | | | | | | | | | | | | | | | | | | | | | | | | 1 | 1 |
| 61 | | | | | | | | | | | | | | | | | | | | | | | | | | | | | | | | | | | | | | | | | | | |
| 62 | | | | | | | | | | | | | | | | | | | | | | | | | | | | | | | | | | | | | | | | | | 1 | 1 |
| 63 | | | | | | | | | | | | | | | | | | | | | | | | | | | | | | | | | | | | | | | | | | | |
| 64 | | | | | | | | | | | | | | | | | | | | | | | | | | | | | | | | | | | | | | | | | | 1 | 1 | ns
DIGITAL STROKE DISPLAY WITH VECTOR, CIRCLE AND CHARACTER GENERATION CAPABILITY

BACKGROUND OF THE INVENTION

1. Field of the Invention

The invention relates to symbol generators particularly with regard to digital stroke generators with the vector, circle and character writing capabilities.

2. Description of the Prior Art

Stroke symbol generators utilizing analog components are known in the prior art. Such apparatus generally tends to be heavy, bulky and expensive compared to equipment utilizing digital components. Digital stroke generators are also known in the prior art but such display symbol generators generally do not provide vectors, circles and characters of high display quality. For example, in the generation of vectors utilizing the conventional sine-cosine technique the vectors generally tend to exhibit noise providing an indistinct appearance because of problems associated with the overflow signals from the multipliers or accumulators utilized in the X and Y display axes. Additionally for a given circuit complexity the average display writing rate is undesirably limited in the prior art displays. With regard to the generation of circular curves, the prior art digital displays do not achieve sufficiently fine control over the radius of the curvature of the curve to be generated. In such prior art apparatus, display of a circle of continuously variable radius tends to be erratic in appearance. The prior art apparatus is additionally limited in that when utilizing digital techniques, circle generation is achieved at a significantly lower writing rate than that utilized for vectors and characters thus providing non-uniformity in brightness with respect to the overall display.

Additionally, in prior art digital circle generators utilizing the sine-cosine technique the beam writing rate and hence the symbol intensity varies in accordance with the size of the circle. This occurs because with the sine-cosine method each circle is drawn in the same time irrespective of size.

Furthermore, in the prior art it was often necessary to utilize separate vector and circle generators resulting in not only excessive equipment but in registration and drift problems with respect to the elements of the display. The prior art symbol generators normally required a significant amount of control data resulting in excessive amounts of control circuitry.

The commercially procurable digital-to-analog converters utilized in digital symbol generators generally become extremely expensive in order to achieve rapid settling time between application thereto of data. This increase in expense has often resulted in a performance compromise with respect to display resolution and clock rate.

SUMMARY OF THE INVENTION

The above described disadvantages of the prior art are obviated in the present invention by a digital stroke display with vector generation capabilities comprising means for positioning the beam along one of the X or Y display axes at a predetermined rate and means responsive to the desired slope of the vector for positioning the beam along the other of the axes at a rate in accordance with the product of the vector slope and the writing rate along the one axis. Circular curves are generated by a concatanated series of vectors utilizing the vector generation apparatus where the vector slopes are provided from a memory that stores the plurality of slopes for the concatanated vectors that comprise the circular curve. A signal representative of the desired curvature of the curcular curve is accumulated in an accumulator, the output of which provides the addresses for the slope memory. Characters are generated by the vector generation apparatus in response to a sequence of stored vector control words for writing a series of vectors comprising the desired character. The invention further includes means for enhancing the resolution of the display in a manner to be described hereinbelow.

BRIEF DESCRIPTION OF THE DRAWINGS

FIG. 4 is a simplified schematic block diagram illustrating the basic principles utilized in the circle generation apparatus of the invention;

FIG. 6 is a chart illustrating control word formats utilized in the apparatus of FIG. 5;

FIG. 10, comprised of FIGS. 10a, 10b, and 10c is a map of the contents of the program memory of the micro controller of FIG. 9.

DESCRIPTION OF THE PREFERRED EMBODIMENT

Figure 1:
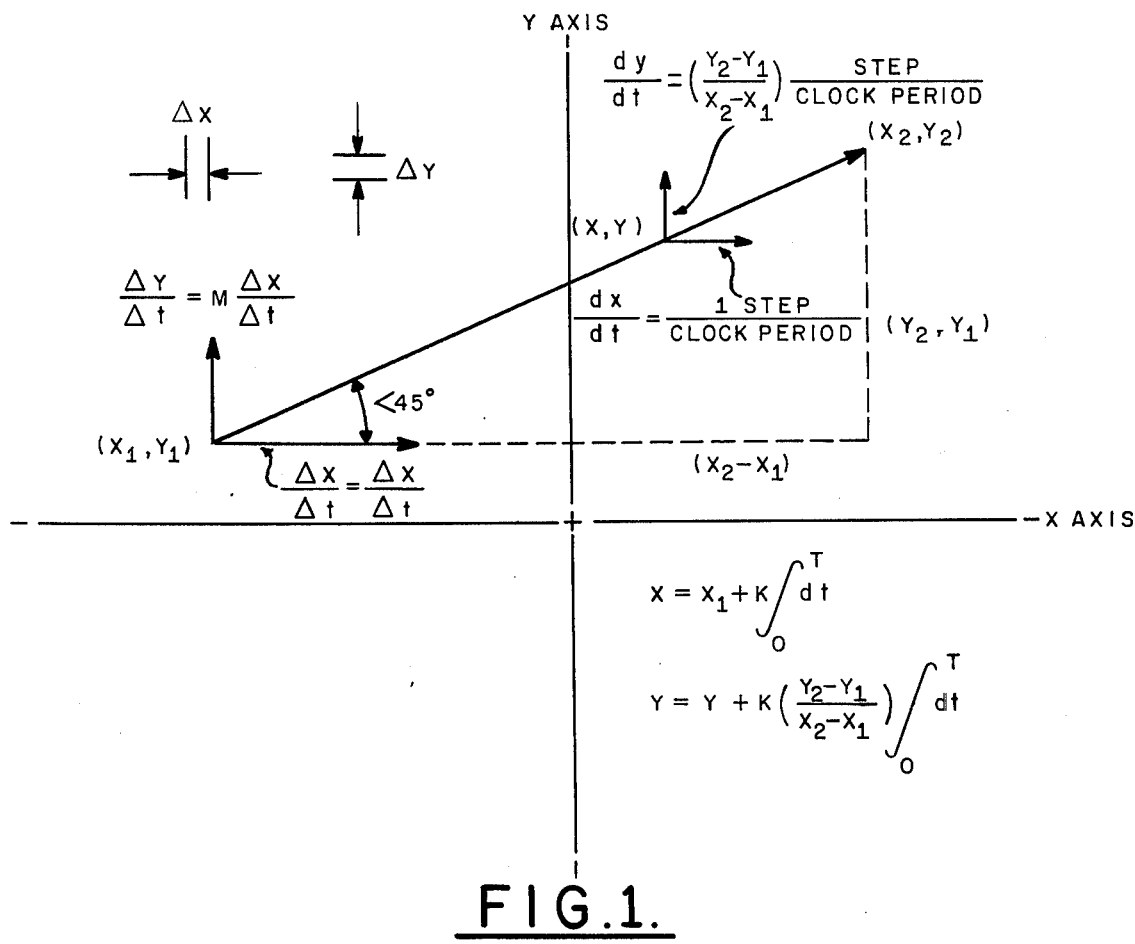
FIG. 1 is a graph illustrating parameters utilized in the vector generation of the present invention.

In the present invention symbols such as vectors, circles and alphanumeric characters are generated by the solution of differential equations utilizing incremental digital integration and multiplication. Referring to FIG. 1, a typical vector to be drawn from point $(X_1, Y_1)$ to the point $(X_2, Y_2)$ is depicted. The vector is illustrated in octant 1. For convenience of the following discussion with respect to FIGS. 1–4, octant 1 will be considered as the 45° sector bounded by the positive X-axis and extending counter clockwise toward the positive Y-axis. Octants 2-8 will be contiguously occurring 45° sectors preceeding counter clockwise from octant 1.

The vector illustrated in FIG. 1 is represented by the equation $$Y - Y_1 = M(X - X_1) \tag{1}$$

where the vector slope M is $$M = \frac{Y_2 - Y_1}{X_2 - X_1} \tag{2}$$

When embodying the invention in a cathode ray tube display the Y component of beam velocity varies with time in accordance with the first derivative with respect to time of Y in equation (1). This first derivative is expressed as $$\frac{dY}{dt} = M\frac{dX}{dt} = \left(\frac{Y_2 - Y_1}{X_2 - X_1}\right)\frac{dX}{dt} \tag{3}$$

Equation 3 is expressed in incremental form as $$\frac{\Delta Y}{\Delta t} = M\frac{\Delta X}{\Delta t} \tag{4}$$

where $\Delta X$ and $\Delta Y$ are the smallest incremental resolution elements provided by the digital-to-analog converters utilized in the system to be described and $\Delta t$ represents the clock period of the system.

Thus the position of the cathode ray tube beam at any instant of time after vector generation has begun is given by $$\begin{cases} X = X_1 + \int_0^T \frac{dX}{dt} dt = X_1 + K \int_0^T dt \\ \\ Y = Y_1 + \int_0^T \frac{dY}{dt} dt = Y_1 + \\ \quad \left(\frac{Y_2 - Y_1}{X_2 - X_1}\right) \int_0^T \frac{dX}{dt} dt = Y_1 + \\ \quad K\left(\frac{Y_2 - Y_1}{X_2 - X_1}\right) \int_0^T dt \end{cases} \tag{5}$$

where $dt$ represents the time between the digital clock pulses of the system and K represents the size of the smallest position change in either X or Y where K will be considered as unity for convenience of discussion. Equation 5 may be represented incrementally as $$X = X_1 + \sum_0^T \frac{\Delta X}{\Delta t} \Delta t \tag{6}$$
$$Y = Y_1 + \sum_0^T M\frac{\Delta X}{\Delta t} \Delta t$$

Figure 2:
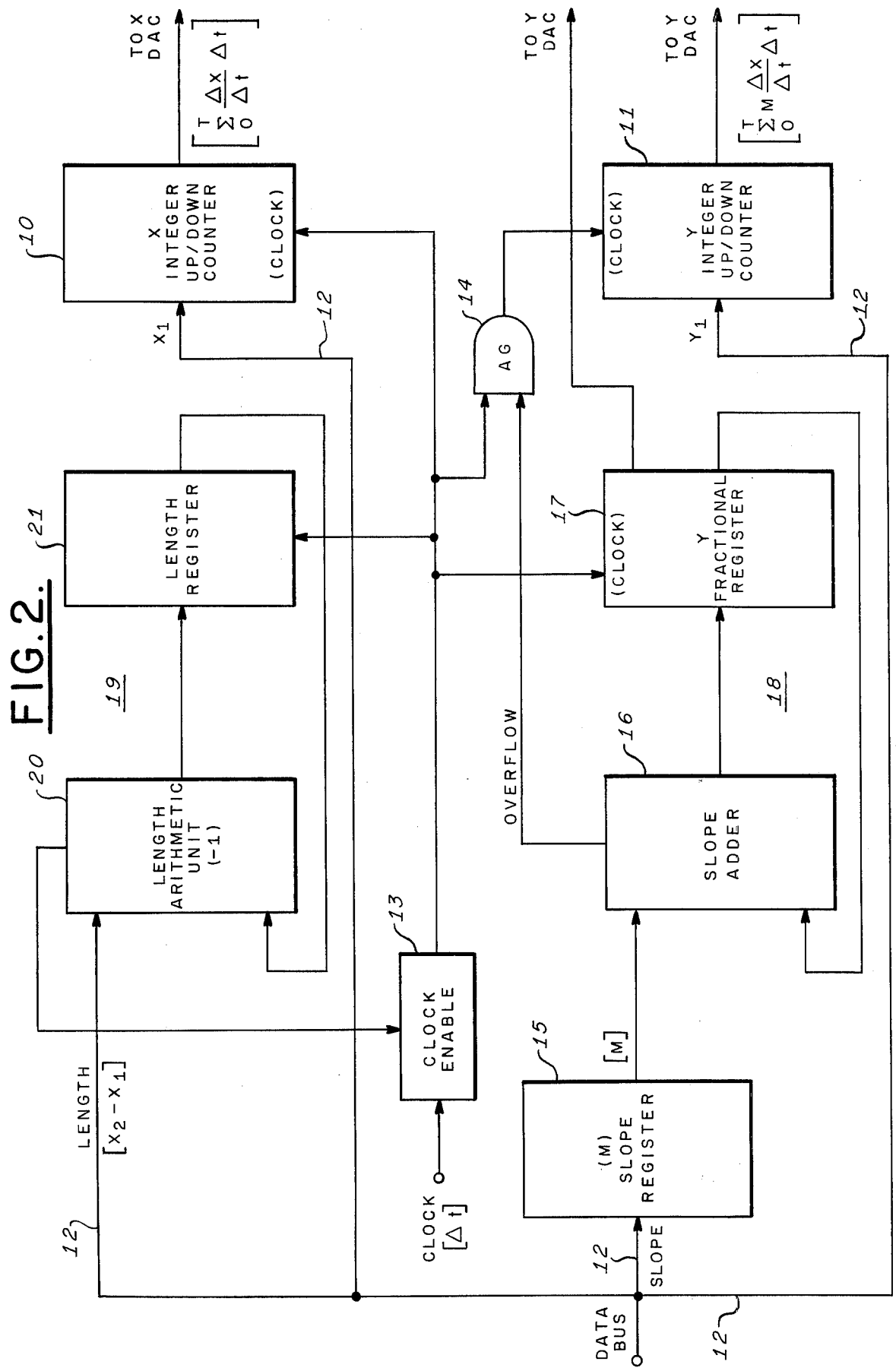
FIG. 2 is a simplified schematic block diagram illustrating the basic concepts utilized in the vector generation apparatus of the invention.

Referring to FIG. 2, a simplified schematic block diagram of apparatus for generating the X and Y deflection signals is illustrated. The vector generation apparatus includes an X integer up/down counter 10 and a Y integer up/down counter 11 that provides digital inputs to X and Y digital-to-analog converters (DAC) not shown. The digital-to-analog converters provide the X and Y deflection signals to the X and Y deflection means of the cathode ray tube display. Initial position values $X_1$ and $Y_1$ are loaded into the counters 10 and 11 respectively via a data bus 12. A clock signal is applied through a clock enable circuit 13 to the clock input of the counter 10 and via an AND gate 14 to the clock input of the counter 11.

A slope register 15 which provides a signal representative of the slope of the vector to be generated is loaded with this slope value from the data bus 12. The output of the slope register 15 is applied as an input to a slope adder 16 whose sum output is applied to a Y fractional register 17. The output of the register 17 is applied as the second input to the adder 16. It is appreciated that the arrangement of the adder 16 and the register 17 comprise a digital accumulator 18 for accumulating the slope value M applied from the register 15. The overflow output from the accumulator 18 which is derived from the adder 16 is applied as an enabling input to the AND gate 14 to transmit the clock pulses therethrough to the counter 11 for reasons to be discussed.

The vector generator of FIG. 2 also includes a length down counter 19 comprised of a length arithmetic unit 20 and a length register 21. The length counter 19 is loaded with a vector length value $(X_2 - X_1)$ from the data bus 12 via the arithmetic unit 20. The output of the arithmetic unit 20 is applied to the length register 21 whose output, in turn, is applied as an input to the arithmetic unit 20. The length register 21 receives clock pulses from the clock enable circuit 13 and the arithmetic unit 20 provides a disabling signal to the circuit 13. The length value from the data bus 12 is stored in the length register 21 through the arithmetic unit 20. In response to the clock pulses from the clock enable circuit 13 the length register 21 applies the value stored therein to the arithmetic unit 20 wherein unity is subtracted therefrom with the diminished value being stored back into the register 21. Thus it is appreciated that the circuit 19 functions as a down counter subtracting unity from the value stored therein in response to the applied clock pulses. When the value stored in the circuit 19 is reduced to zero, the arithmetic unit 20 provides the disable signal to the clock enable block 13 to terminate the application of the clock pulses.

In operation, the X and Y integer up/down counters 10 and 11 are preset to the initial vector point $X_1$ and $Y_1$ respectively via the data bus 12. The data bus 12 then transfers the vector slope to the slope register 15 and the length value $X_2 - X_1$ to the down counter 19 which thereby enables the vector generator clock via the circuit 13. At the beginning of each clock pulse the X integer counter 10 is incremented by one, the Y fractional register 17 is incremented by M, the Y integer counter 11 is incremented by one if the result of the Y fractional increment produced an overflow from the adder 16, and the length down counter 19 is decremented by one. The clock pulses through the clock enable circuit 13 continue to up date the counters and registers until the length down counter 19 attains zero at which time the X and Y integer up/down counters 10 and 11 contain the values $X_2$ and $Y_2$ respectively. Thus by this procedure a vector is drawn from the point $(X_1, Y_1)$ to the point $(X_2, Y_2)$.

It is observed that the input to the Y digital-to-analog converter is provided not only from the counter 11 but also from the register 17. This arrangement is utilized for enhancing the display resolution in a manner to be later described.

The apparatus of FIG. 2 as illustrated and as described above is applicable only to vectors occupying octant 1, i.e., vectors in which $X_2 \geq X_1$, $Y_2 \geq Y_1$, and $M \leq 1$. Thus as the beam is advanced along the X axis, the slope values which are less than unity are accumulated by the accumulator 18 and when the accumulated total achieves unity, the overflow signal from the adder 16 enables the AND gate 14, permitting a clock pulse to increment the counter 11. Thus the binary point for the fractional register 17 is at the most significant end of the register. For vectors occupying octant 2 the slope M is in the range of 1-∞. Since incremental arithmetic logic becomes very cumbersome when the binary point falls at some point other than at either end of a register, it is convenient to restrict the value of M to the range of 0-1 and to change the form of the equations utilized. Thus vectors with slopes in the range of 1-∞ are generated by equations $$\begin{cases} Y = Y_1 + K \int_0^T dt \\ \\ X = X_1 + K \frac{X_2 - X_1}{Y_2 - Y_1} \int_0^T dt \end{cases} \quad (7)$$

where M is redefined as $$M = \frac{(X_2 - X_1)}{(Y_2 - Y_1)} \quad (8)$$

Thus it is appreciated that as redefined M has a range of values of 1-0 for octant 2.

In order to restructure the hardware to utilize equations 7 and 8 in octant 2 it is merely necessary to interchange the clock inputs to the counters 10 and 11 and to preset the length counter 19 with $Y_2 - Y_1$. Vectors that occupy octants 1 and 2 have positive values for the parameters $X_2 - X_1$, $Y_2 - Y_1$, $$\frac{Y_2 - Y_1}{X_2 - X_1} \text{ and } \frac{X_2 - X_1}{Y_2 - Y_1}.$$

For the six remaining octants, one of more of these parameters are negative. In such instances it is necessary to control the counting direction of the counters 10 and 11 to accommodate the negative values. Thus to utilize the two sets of equations (5) and (7) in all eight octants it is necessary to either utilize the clock inputs to the counters 10 and 11 as illustrated in FIG. 2 or to interchange the two inputs as well as to control the counting direction of the up/down counters 10 and 11 and to control the presetting of the down counter 19 with either $(X_2-X_1)$ or $(Y_2-Y_1)$ in accordance with the particular octant in which the vector lies. The following Table I indicates the polarities and comparisons as well as the control conditions for the apparatus of FIG. 2 for the eight octants.

TABLE I

| OCTANT | VECTOR DIRECTION | $X_2 - X_1$ | $Y_2 - Y_1$ | $\|X_2 - X_1\| > \|Y_2 - Y_1\|$ | X U/D Cntr | Y U/D Cntr | AG to Y Ctr |
|---|---|---|---|---|---|---|---|
| 1 | ↗ | + | + | Yes | Up | Up | Yes |
| 2 | ↗ | + | + | No | Up | Up | No |
| 3 | ↖ | − | + | No | Down | Up | No |
| 4 | ↖ | − | + | Yes | Down | Up | Yes |
| 5 | ↙ | − | − | Yes | Down | Down | Yes |
| 6 | ↙ | − | − | No | Down | Down | No |
| 7 | ↘ | + | − | No | Up | Down | No |
| 8 | ↘ | + | − | Yes | Up | Down | Yes |

In the column of Table 1 labeled "AG to Y Counter" a "yes" indicates the connection as illustrated in FIG. 2 and a "no" indicates the reverse connection where the clock input leads to the counters 10 and 11 are reversed with respect to each other. It will be appreciated that the control of the X and Y up/down counters as well as the control of the clock inputs thereto may be effected by utilizing an octant counter (not shown in FIG. 2 but later to be described) whose output is decoded to provide the counter and clock gate control signals. Alternatively, it is observed from Table 1 that the sign of $X_2-X_1$ can be utilized without modification to control the counting direction of the X integer up/down counter. Furthermore, the sign of $Y_2-Y_1$ may be similarly utilized to control the counting direction of the Y integer up/down counter and the result of the comparison of the magnitudes of the vector components may be utilized to control the application of the clock to the counters 10 and 11. Apparatus for performing the described control functions will be illustrated and explained hereinbelow with respect to FIG. 5.

Figure 3:
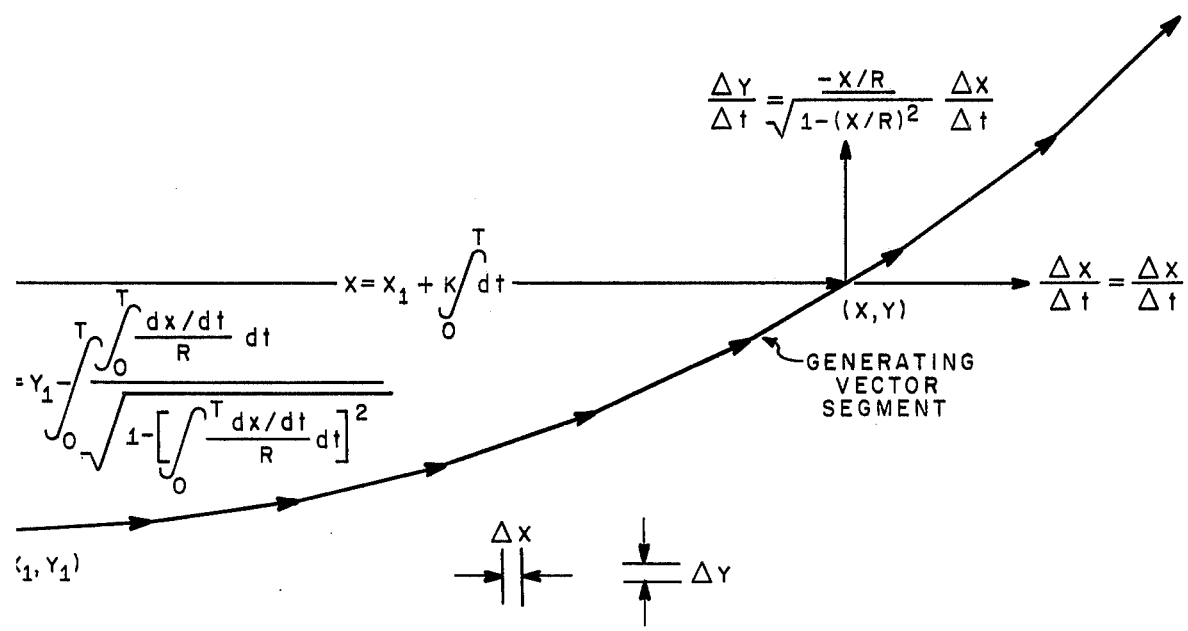
FIG. 3 is a graph illustrating parameters utilized in the circular curve generation apparatus of the invention.

Referring to FIG. 3, a portion of a circular arc generated in accordance with the present invention is illustrated. The equation for a circle with the center at the origin is $$X^2 + Y^2 = R^2 \quad (9)$$

Following the procedure utilized above with respect to the vector generator, equation 9 is differentiated with respect to time yielding.

$$X \frac{dX}{dt} + Y \frac{dY}{dt} = 0 \quad (10)$$

Thus, since $$\frac{dX}{dt} = \frac{-Y}{X} \frac{DY}{dt} \text{ and } X = R \sqrt{1 - \frac{Y^2}{R^2}} \quad (11)$$

it follows that $$\frac{dX}{dt} = \frac{-Y/R}{\sqrt{1 - Y^2/R^2}} \frac{dY}{dt} \quad (12)$$

Thus it is appreciated that $$\frac{-Y/R}{\sqrt{1 - Y^2/R^2}} \quad (13)$$

is the slope of the curve at any point Y/R on the circle. The differential form of Y/R is then utilized as the input specification for the circle radius so that one set of equations to be implemented for octants 2, 3, 6 and 7 is $$\begin{cases} Y = Y_1 + K \int_0^T dt \\ X = X_1 - \int_0^T \frac{\int_0^T \frac{dY/dt}{R} dt}{\sqrt{1 - \left[\int_0^T \frac{dY/dt}{R} dt\right]^2}} dt \end{cases} \quad (14)$$

This follows since $$Y = \int_0^T \frac{dY}{dt} dt \quad (15)$$

In a manner similar to that described above with respect to vector generation, a second set of equations is utilized for implementing the apparatus for octants 1, 4, 5 and 9 so as to maintain the slope values less than unity. This set of equations is given by $$\begin{cases} X = X_1 + K \int_0^T dt \\ Y = Y_1 - \int_0^T \frac{\int_0^T \frac{dX/dt}{R} dt}{\sqrt{1 - \left[\int_0^T \frac{dX/dt}{R} dt\right]^2}} dt \end{cases} \quad (16)$$

The circle octants referred to above are the octants in which the generating vector segments are located. The incremental forms of equations 16 are $$\begin{cases} X = X_1 + \sum_0^T \frac{\Delta X}{\Delta t} \Delta t \\ Y = Y_1 + \sum_0^T \frac{-X/R}{\sqrt{1 - (X/R)^2}} \frac{\Delta X}{\Delta t} \Delta t \end{cases} \quad (17)$$

The incremental forms of equations 14 may similarly be derived.

Referring still to FIG. 3, a diagram of a 45° segment of a circle generated in octant 1 is illustrated. The segment is comprised of a series of concatanated vectors drawn utilizing apparatus similar to that illustrated in FIG. 2. Although eight vector segments are depicted for simplicity, the number of generating segments for the circular curve is determined primarily by the size of the slope read only memory to be discussed with respect to FIG. 4. As a practical manner, it has been ascertained that 32 vector segments per 45° arc generates an exceedingly smooth curve which requires only 256 bits of read only memory.

Referring to FIG. 4, a block diagram of a circle generator implemented in accordance with the invention is illustrated in which like reference numerals indicate like components with respect to FIG. 2. The X integer up/down counter 10, the Y integer up/down counter 11, the slope accumulator 18 comprising the slope adder 16 and the Y fractional register 17, as well as the AND gate 14 were included in the apparatus of FIG. 2 and performed the functions as described above with respect to generating the vector segments comprising the circular curve. The circle generation apparatus further includes a read only memory 25 that stores the slopes of the various vectors (32 vectors in the present embodiment) that comprise the 45° arc of the circle. These slope values are selectively applied as the input to the slope accumulator 18 for reasons to be discussed. The slope memory 25 is addressed from the output of a curvature accumulator 26 which is comprised of a curvature adder 27 and a curvature accumulator register 28. The input to the accumulator 26 is provided from a circle curvature designation register 29. The overflows from the accumulator 26 are provided by the adder 27 to an octant counter to be described below with respect to FIG. 5. A clock enable circuit 30 controllably provides clock pulses to the accumulators 18 and 26, to the counter 10 and to the counter 11 through the AND gate 14.

In operation the X and Y integer up/down counters 10 and 11 are preset to the initial point of the curve $X_1$ and $Y_1$ respectively via the data bus 12. A number $\Delta Y/R$ representative of the curvature of the circular curve to be generated is loaded into the curvature register 29. During each clock pulse the X integer counter 10 is incremented by unity, the Y/R register 28 is incremented by the $dY/dt/R$ from the register 29, and the Y fractional register 17 is incremented by the slope provided from the memory 25 in accordance with the address from the Y/R register 28. The Y integer counter 11 is incremented by unity through the AND gate 14 in response to the overflows from the slope accumulator 18.

Specifically $\Delta X$ and $\Delta Y$ are the resolution elements of the display and represent the distance the beam moves in response to the least significant bit of each of the DAC counters 10 and 11. The circle to be generated is completely specified by the ratio of $\Delta Y/R$ where R is the circle radius. The curvature accumulator 26 accumulates $\Delta Y/R$, thus incrementing the register 28 in a linear manner by the $\Delta Y/R$ increments for the first octant. The circle is started and generated counter-clockwise through the first octant while the X DAC counter 10 is uniformly incremented by the clock. The linear incremental steps from the accumulator 26 are provided as the addresses to the rom 25 which stores the corresponding slopes for each of the 32 vectors into which the octant is quantized. For large radius circles the accumulator 26 will accumulate many steps while dwelling on the same addressed slope in the rom 25. This is achieved by utilizing a 16-bit accumulator register for the register 28 and using the five most significant bits thereof to address the 32 slopes stored in the rom 25. These slopes are applied to the slope accumulator 18 and each vector segment of the circular curve is drawn in the manner described above with respect to FIG. 2 for vector generation. Thus it is appreciated that the slope of the circular curve is a continuously varying function which is generated by the adder 27, the register 28 and the rom 25 according to the equation $$\frac{dY}{dt} = \int_0^T \frac{\int_0^T \frac{dX/dt}{R}}{\sqrt{1 - \left[\int_0^T \frac{dX/dt}{R}\right]^2}} dt \quad (18)$$

The circle generator of FIG. 4 generates arcs in only one octant. To generate a complete circle a 3-bit octant counter (to be described below with respect to FIG. 5) is utilized to specify the octant which is being drawn. The octant counter is incremented by unity each time the adder 27 overflows, which overflow or carry out occurs at each 45° sector boundary, thereby advancing the octant by one. In order to generate the complete circle, the adders 16 and 27 are replaced by adder/subtractors and switching means is provided by which the clock inputs to the counters 10 and 11 may be interchanged. Additionally, control signals are provided to control the counting directions of the counters 10 and 11. The following Table 2 designates the various control states and relationships of the controlling signals for the adder/subtractors 16 and 27, the X and Y integer clocks to the counters 10 and 11, the counting directions for the X and Y integer counters 10 and 11 and the states of the octant counter. Specific controlling circuitry will be described with respect to FIG. 5.

drawn until the contents of the octant counter and the Y/R Register 28 are equal to the End of Arc Register.

As discussed above with respect to FIGS. 2 and 4, several of the components are commonly utilized in both the vector and circle generators. The elements 10, 11, 14 and 16-18 are so utilized. It will be appreciated that the length accumulator 19 and the octant accumulator 26 may be combined to provide the required functions. Additionally, the switching (not shown in FIGS. 2 and 4) for controlling the curve generation in the various octants may also be shared between the functions.

Referring to FIG. 5, an integrated display stroke generator with vector, circle and character generation capabilities is illustrated where like reference numerals designated like components with respect to FIGS. 2 and 4. The display apparatus includes a data source 35 for storing and providing a sequence of display command words under control of a micro controller 36. The micro controller 36 controls the data source 35 and the components of the display apparatus for generating the vectors, circles and characters comprising the display picture to be drawn. The display apparatus further includes a character memory 37 for storing short vector data words utilized in generating characters. Both the data source 35 and the character memory 37 store and provide 16-bit command words for controlling the display generation.

Referring for the moment to FIG. 6, the formats of the display command words are illustrated. In order to move the cathode ray tube beam to an initial position, an initialize X position word is utilized wherein bits 15-10 provide the function code for the X position initialization procedure and bits 9-0 provide the X coordi-

TABLE 2

| OCTANT | GENERATING VECTOR DIRECTION | AG TO G or D INTEGER COUNTER | X INTEGER COUNTER DIRECTION | Y INTEGER COUNTER DIRECTION | dy/dt R ADDER/SUBT | SLOPE ADDER/SUBT |
|---|---|---|---|---|---|---|
| 1 | → | Y | Up | Up | Add | Add |
| 2 | ↑ | X | Up | Up | Subtract | Subtract |
| 3 | ↖ | X | Down | Up | Add | Add |
| 4 | ↖ | Y | Down | Up | Subtract | Subtract |
| 5 | ↙ | Y | Down | Down | Add | Add |
| 6 | ↓ | X | Down | Down | Subtract | Subtract |
| 7 | ↘ | X | Up | Down | Add | Add |
| 8 | → | Y | Up | Down | Subtract | Subtract |

To generate circular arcs of any included angle the octant counter to be described is provided with presetting means and an end of arc register is utilized to specify the ending octant and the state of the register 28 at the last point on the arc. In order to generate an arc the following operations are performed.

1. $X_1$ to the X integer Counter 10—X position at start of arc.
2. $Y_1$ to the Y integer Counter 11—Y position at start of arc.
3. Initial Y/R to Y/R register 28— specifies initial slope.
4. Initial octant to octant counter.
5. dY/dt/R to dY/dt/R Register 29
6. Ending octant and state of Y/R Register 28 at end of arc to the End of Arc Register.

After the above operations are performed the clock input is enabled via the circuit 30 and the circular arc is nate of the initial beam position. Similarly, a command word is utilized to initialize the Y position where the bits 15-10 specify this function and the bits 9-0 provide the initial Y coordinate. Two command words are utilized to specify the drawing of a vector. The function code bits 15-10 of the first vector command word specify the vector drawing function and the bits 9-0 of the first vector word provides the vector length. Bit 13 of the second vector command word determines whether the video is active or inactive for the particular vector to determine whether the vector should be drawn or blanked. The bits 12-10 of the second vector control word provide the octant in which the vector lies. Bits 9-0 of the second vector control word provide the slope of the vector.

Characters are drawn under the control of short vector command words stored in the character memory 37.

Bit 14 of the short vector command word provides an end of character command. Bit 13 of the word provides the video control and determines whether the vector will be blanked or not. Bits 12-10 of the short vector command word provides the octant in which the vector will lie whereas bits 9-5 and bits 4-0 provide the length and slope data for the vector respectively. Characters are drawn by providing appropriate sequences of short vector display command words.

A character command word stored in the data source 35 provides the address in the character memory 37 that contains the initial short vector for the character. The bits 15-10 of the character command word designates the character writing function and the bit 9-0 provide the character memory initial address.

In order to control the generation of circles, a circle command word is provided by the data source 35 where bits 15-14 designate the circle generation function and bits 13-0 provide the curvature data, K/Radius.

The display command format also includes an end of message command word where the function code bits 15-10 provides the code for this function. The end of message command word is utilized at the end of a sequence of display commands to signal that the display generation has been completed.

Referring again to FIG. 5, the data source 35 is loaded with an appropriate sequence of command words so as to control the display apparatus to generate the sequence of desired vectors, circles and characters. The character memory 37 similarly is loaded with the sequences of short vector command words for controlling the generation of the characters. The data source 35 provides the bits 15-10 on a line 38 to the micro controller 36 to be decoded therein such that the micro controller provides appropriate control signals to the components of the display apparatus to perform the functions called for by the function code of the command word. It will be appreciated that although the line 38 is illustrated as a single conductor, it in fact comprises six conductors for conveying the bits 15-10 in parallel. In a smaller manner, many of the other conductors of FIG. 5 comprise parallel lines for conveying the designated parallel bits. For convenience the term "line" will be utilized to designate these parallel conduits.

The apparatus of FIG. 5 further includes a three input length and curvature multiplexer 39 which in response to a two bit selection signal on a line 40 from the micro controller 36, selectively connects one of its inputs (0), (1) or (2) to its output. The (0) input of the multiplexer 39 is selected via the line 40 during vector generation to connect the bits 9-0 to the multiplexer output so as to convey the vector length thereto provided by the vector control word from the data source 35. During circle generation, input (2) of the multiplexer 39 is activated so as to convey the curvature data from the circle command word to the output of the multiplexer. In a similar manner, when the apparatus is performing character generation, the (1) input of the multiplexer 39 is selected so as to convey the length data from the short vector words from the character memory 37 to the multiplexer output.

The output of the length and curvature multiplexer 39 is connected to the (B) input of a length and curvature arithmetic unit 41 whose output is applied as the input to a length and curvature register 42. The output of the length and curvature register 42 is, in turn, connected to the (A) input of the arithmetic unit 41. The arithmetic unit 41, together with the length register 42, form an accumulator 43 which provides the functions of the length down counter 19 of FIG. 2 as well as the function of the octant or curvature accumulator 26 of FIG. 4. The (A) and (B) inputs and the output of the arithmetic unit 41 as well as the input and output of the length register 42 are parallel 16-bit inputs and outputs. The multiplexer 39 is connected with the (B) input of the arithmetic unit 41 such that the bit groupings applied to the inputs of the multiplexer 39 are transferred to the accumulator 43 right justified with respect to the 16 bits thereof.

The arithmetic unit 41 receives a three bit function controlling signal on a line 44 from the micro controller 36 in accordance with the function to be performed thereby for the particular display generation mode that the apparatus is effecting. In the vector generation mode as well as in the character generation mode the signal on the function line 44 sets the arithmetic unit 41 to subtract unity from the input (A) in order that the accumulator 43 functions as a down counter with respect to the length data provided by the multiplexer 39. When the apparatus is operating in the circle generation mode, the unit 41 is controlled to function as an adder/subtracter, the addition and subtraction function being controlled by the micro controller 36 via the line 44. When utilized in the addition mode the unit 41 provides the sum of the inputs (A) and (B) at its output. When operating in the subtraction mode the unit 41 subtracts the input (B) from the input (A) providing the difference at its output. The length and curvature register 42 receives a load control input from the micro controller 36 on a line 45. A clock pulse applied to the load line 45 strobes the output of the arithmetic unit 41 into the register 42 for storage therein. Thus when functioning as a down counter in the vector and character generation modes, the arithmetic unit 41 subtracts unity from the number stored in the register 42 storing the decremented value back into the register upon application of a clock pulse to the load line 45. When functioning as an adder/subtracter, the sum or difference of the number stored in the register 42 and the number applied to the (B) input of the unit 41 is strobed into the register 42 upon application of a clock pulse to the load line 45. Thus it is appreciated that when the arithmetic unit 41 is operating as an adder/subtracter, the device 43 comprising the elements 41 and 42 operates as an accumulator for additively or subtractively accumulating the value applied to the input (B) of the unit 41. As described above, this accumulation function is utilized for accumulating the curvature data when generating circles. When operating in the vector or character generation mode the device operates as a down counter decrementing the vector length by unity so as to provide an end of vector indication.

The end of vector indication, when operating in the vector mode, is provided by an exclusive OR gate 46 whose two inputs are connected respectively to bit 10 of the output of the register 42 and bit 10 of the output of the arithmetic unit 41. When operating as a down counter the vector length is counted down to zero at which time a difference in sign between the arithmetic unit 41 and the register 42 occurs causing the exclusive OR gate 46 to provide the end of vector indication. In a similar manner, an exclusive OR gate 47 connected to respective bits 5 of the output of the register 42 and the output of the arithmetic unit 41 detects the end of a short vector utilized in character generation.

In circle generation the end of each octant is detected by overflows and underflows of the arithmetic unit 41 and an end of octant signal is provided on the arithmetic unit carry out line 48. A signal on a line 49 from the micro controller 36 applied to the clear input of the register 42 clears the register to zero.

The five most significant bits B15-11 from the length and curvature register 42 are utilized to address the slope memory 25 discussed above with respect to FIG. 4. The slope memory 25 stores 32 8-bit words which 32 words are addressed by the bits 15-11 as indicated, each word providing the slope data for one of the 32 vectors into which each octant of a circle to be generated is quantized.

The apparatus also includes a three input slope multiplexer 55 which selectively connects its inputs (0), (1) and (2) to its output in accordance with a two bit selection signal from the micro controller 36 on a line 56. The multiplexer 55 provides a 10-bit parallel output in accordance with the selected input. The input (0) of the multiplexer 55 receives the 8-bit words from the slope memory 25 which are right justified with respect to the 10-bit output. The input (1) of the multiplexer 55 is connected to receive the slope bits 4-0 from the short vector command words stored in the character memory 37. These five short vector slope bits are applied right justified to the 10-bit parallel output of the multiplexer 55. The input (2) of the multiplexer 55 receives the 10 slope bits B9-0 from the data source 35 when operating in the vector generation mode.

The output from the multiplexer 55 is applied to the (B) input of the slope adder/subtracter 16. The output of the adder/subtracter 16 is applied to the input of the slope register 17 whose output in turn is applied to the (A) input of the adder/subtracter 16. The components 16 and 17, as described above with respect to FIG. 2, comprise a slope accumulator 18. The adder/subtracter 16, as well as the slope register 17, are 11-bit devices. The (A) and (B) inputs to the adder/subtracter 16 and the output thereof as well as the input and output of the slope register 17 are 11-bit parallel inputs and outputs. The function performed by the adder/subtracter 16 is controlled by a signal from the micro controller 36 on a line 57. When the adder/subtracter 16 is controlled to perform the addition function, the sum of the numbers applied to the inputs (A) and (B) is applied to the output. When the adder/subtracter 16 is controlled to perform the subtraction function, the difference applied to the output results from subtracting the number at the input (B) from the number at the input (A). The 11-bit number applied to the input to the slope register 17 is strobed for storage therein by application of a clock pulse from the micro controller 36 to register load line 58. Thus in a manner similar to that described above with respect to the accumulator 43, the accumulator 18 additively or subtractively accumulates the slope value provided to the input (B) of the adder/subtracter 16 from the slope multiplexer 55. The slope register 71 is cleared by a signal from the micro controller 36 on line 59 to the clear input of the register.

As discussed above with respect to FIGS. 2 and 4, overflows of the slope accumulator 18 are utilized for gating the clock to one of the beam deflection counters. The appropriate overflow signals for the vector, circle and character are provided by an EXCLUSIVE OR gate 60 via a three input dual overflow multiplexer 61. The overflow multiplexer 61 is comprised of two commonly controlled three input multiplexers 62 and 63 which concurrently selectively connect either the input (0), the input (1), or the input (2) to the respective output in accordance with a two bit signal from the micro controller 36 on a line 64. The inputs (0), (1) and (2) of the multiplexer 63 are connected respectively to bits 10, 5 and 8 of the output of the adder/subtracter 16 and the inputs (0), (1) and (2) of the multiplexer 62 are connected respectively to the bits 10, 5 and 8 of the output of the register 17. The respective outputs from the multiplexers 62 and 63 provide the inputs to the EXCLUSIVE OR gate 60. In this manner overflows with respect to vector generation, character generation (short vectors) and circle generation are detected by selectively connecting the (0), (1) or the (2) inputs of the multiplexers to the outputs respectively.

As discussed above with respect to FIGS. 2 and 4, the detected overflow from the slope accumulator 18 controls the application of the clock signals to the X and Y DAC counters 10 and 11. The manner in which the overflow signal from the EXCLUSIVE OR gate 60 accomplishes this switching function will be hereinafter described.

As discussed above, with respect to the length down counter and accumulator 43, the indications of overflow and underflows therefrom are provided by the EXCLUSIVE OR gates 46 and 47 and by the line 48. These three overflow and underflow indications are provided respectively to inputs (0), (1) and (2) of a three input stop multiplexer 65. The inputs to the multiplexer 65 are selectively connected to its output under control of a two bit selection signal from the micro controller 36 via a line 66. The output of the multiplexer 65 is applied to the micro controller 36 via a line 67 to signal the micro controller 36 that specific control actions should be performed in a manner to be described.

The display apparatus of FIG. 5 includes a two input octant multiplexer 68 that selectively connects either its input (0) or its input (1) to its output under control of a selection signal from the micro controller 36 on a line 69. The input (0) of the multiplexer 68 is utilized in vector generation and receives the octant bits B12-10 from the vector command word provided by the data source 35. The input (1) of the multiplexer 68 is utilized in character generation and receives its input from the octant bits B12-10 from the short vector command word provided by the character memory 37.

The octant data from the multiplexer 68 is loaded into a 3-bit octant counter 70 under control of a loading signal from the micro controller 36 applied on a line 71. The micro controller 36 selectively increments the octant counter 70 by selectivly applying a clock pulse on an increment line 72. The micro controller 36 additionally selectively clears the octant counter 70 to its zero state by a signal on a clear line 73. The micro controller 36 detects overflows of the octant counter 70 via a line 74 for effecting control of the components of the apparatus for the generation of vectors, circles and characters.

The output bits B0 and B1 of the octant counter 70 are applied as inputs to an EXCLUSIVE OR gate 80 and the bits B1 and B2 of the counter 70 are applied as the inputs to an EXCLUSIVE OR gate 81. The output of the EXCLUSIVE OR gate 80 is applied as an input to an OR gate 82 and through an inverter 83 as an input to an OR gate 84. A second input to each of the OR gates 82 and 84 is provided by the output of the EXCLUSIVE OR gate 60 which provides the overflow indications from the slope accumulator 18. The output from the OR gate 82 is applied as an input to an AND gate 85 and the output of the OR gate 84 is applied as an input to an AND gate 86. The system clock from the micro controller 36 is applied via a line 87 as an input to both the AND gates 85 and 86. All of the clock pulses on the line 87 are transmitted through one of the AND gates 85 and 86 and those clock pulses that are coincident with overflows provided by the EXCLUSIVE OR gate 60 are transmitted through the other of the AND gates 85 and 86, the selection of the gates being made in accordance with the state of the octant counter 70. This provides the clock switching function discussed above with respect to FIGS. 2 and 4 and Tables 1 and 2 and in a manner to be further described in detail hereinbelow.

As described above with respect to FIGS. 2 and 4, the apparatus includes the 10-bit X up/down counter 10 and the 10-bit Y up/down counter 11. The X and Y initial position data provided by the display command words from the data source 35 and contained in bits 9-0 thereof (FIG. 6) are loaded into the counters 10 and 11 under control of the micro controller 36 via signals on lines 88 and 89 respectively. Clock pulses are gated to the counters 10 and 11 through the AND gates 86 and 85 respectively. Thus, for the reasons discussed above with respect to FIGS. 2 and 4 and to be further discussed hereinafter, the unmodified clock pulse train is applied to one of the counters and the clock pulse train controlled by the overflow of the slope accumulator 18 is gated to the other counter. The up/down counting direction control for the counter 10 is provided by the output of the EXCLUSIVE OR gate 81 whereas the counting direction control for the counter 11 is provided by the most significant bit (bit 2) from the octant counter 70. These connections will effect the counting directions delineated and discussed above with respect to Tables 1 and 2 and to be further described hereinbelow.

The apparatus further includes resolution enhancement AND gates 90, 91, 92 and 93 for reasons to be discussed below with respect to the resolution enhancement feature of the invention. This feature is utilized in the vector, character and circle generation modes of the apparatus and is basically implemented by appending several of the most significant bits from the slope register 17 to the least significant end of the one of the X and Y counters 10 and 11, respectively, that is receiving its count input from the overflows of the slope accumulator 18. Particularly, in the preferred embodiment of the invention, the two most significant bits from the slope register 17 are utilized. It will be appreciated, however, that for vector generation these constitute bits 9 and 8, for character generation bits 4 and 3 and for circle generation bits 7 and 6. A duplex resolution multiplexer 140, similar to the duplex overflow multiplexer 61, is utilized to provide the appropriate two most significant bits in accordance with the symbology generation mode of the apparatus. Thus the appropriate bits from the slope register 17 are applied to the (0), (1) and (2) inputs to the two halves of the multiplexer 140. The selection of the inputs through the multiplexer 140 is effected simultaneously with that of the multiplexer 61 via the control signals on the line 64.

As previously discussed and in a manner to be later described in further detail, the slope accumulator 18 is controlled as an additive and subtractive accumulator and the counting directions of the counters 10 and 11 are controlled in accordance with the symbol generation mode. It will be appreciated that the accumulation direction of the slope accumulator 18 is not always the same as the counting direction of the counter receiving the slope accumulator overflow signals as described. In order to properly append the bits from the slope accumulator 18 to the appropriate counter, the accumulation and counting directions must be the same. Therefore, the appropriate two most significant bits from the slope register 17, transmitted through the two halves of the multiplexer 140, are applied to respective EXCLUSIVE OR gates 141 and 142 which are utilized controllably either to transmit the bits directly or to transmit the bits in complement form. As is well known, the accumulation direction of a binary progression may apparently be reversed by complementing the progression. Thus, the EXCLUSIVE OR gates 141 and 142 are controlled whereby the selected two most significant bits from the accumulator 18 are either complemented or transmitted directly so as to match the apparent accumulating direction of the accumulator 18 with the counting direction of the counter receiving the overflow signals.

The most significant bit from the upper half of the multiplexer 140 is transmitted through the EXCLUSIVE OR gate 141 to the AND gates 90 and 92. The second most significant bit from the lower half of the multiplexer 140 is transmitted through the EXCLUSIVE OR gate 142 to the AND gates 91 and 93. The second input to the AND gates 90 and 91 is provided by the output of the EXCLUSIVE OR gate 80 and the second input to the AND gates 92 and 93 are also provided by the EXCLUSIVE OR GATE 80 but through the inverter 83. Thus it is appreciated that when one set of the AND gates 90, 91 and 92, 93 is enabled, the other set is disabled for reasons to be clarified.

The apparent direction of the accumulation provided by the gates 141 and 142 is controlled by components 150-158 in response to the state of the octant counter 70 and the L-10 control bit of the 2-bit control line 64. The L-10 control bit is provided by the micro controller 36 in a manner to be described. The inverter 150, the NAND gate 151 and the EXCLUSIVE OR gate 152 control the gates 141 and 142 when the apparatus is in the vector or character generation mode whereas the NOR gate 155 and the EXCLUSIVE OR gate 156 are utilized during the generation of circles. The inverter 153, the AND gates 154 and 157 and the OR gate 158 are utilized as a multiplexer which selects the required function depending on the state of the control signal L-10.

The following Table 3 depicts the relationship between the octant, the apparatus mode and the enhancement bits accumulation direction correction. The "counter direction" and "enhanced counter" columns are as previously described. "Counter required direction" is the counting direction of the counter enhanced for that octant. "Accumulation direction" is the slope accumulator operation in relation to the mode and octant. "Action taken" is the operation required of the EXCLUSIVE OR gates 141 and 142. The legends U, D, T, and C represent up, down, true and complement respectively where T signifies that the two bits from the resolution multiplexer 140 are transmitted unchanged whereas complement specifies changing the accumulation direction. It will be appreciated that the octant numbers and vector directions in the "octant" column are those indicated with respect to the legend "octant" of FIG. 7 to be discussed.

TABLE 3

| OCTANT | COUNTER DIRECTION X Y | ENHANCED COUNTER | COUNTER REQUIRED DIRECTION | ACCUMULATION DIRECTION VECTOR OR CHARACTER | ACCUMULATION DIRECTION CIRCLE | ACTION TAKEN VECTOR OR CHARACTER | ACTION TAKEN CIRCLE |
|---|---|---|---|---|---|---|---|
| 0 | D D | Y | D | U | U | C | C |
| 1 | D D | X | D | U | D | C | T |
| 2 | U D | X | U | U | U | T | T |
| 3 | U D | Y | D | U | D | C | T |
| 4 | U U | Y | U | U | U | T | T |
| 5 | U U | X | U | U | D | T | C |
| 6 | D U | X | D | U | U | C | C |
| 7 | D U | Y | U | U | D | T | C |

The display apparatus illustrated in FIG. 5 includes a 12-bit X digital-to-analog converter 94 and a 12-bit/-digital-to-analog converter 95. The ten most significant input bits, (bits 11-2) to the X DAC 94 are provided by the 10 output bits of the X counter 10 and the ten most significant input bits to the Y DAC 95 are provided by the 10 output bits of the Y counter 11. The two least significant input bits, bit 1 and bit 0, to the X DAC 94 are provided by the AND gates 90 and 91 respectively whereas the two least significant bits, bit 1 and bit 0, to the Y DAC 94 are provided by the AND gates 92 and 93 respectively. The outputs from the X DAC 94 and the Y DAC 95 are applied to the respective X and Y deflection means 96 of a cathode ray tube 97. Thus the beam of the cathode ray tube 97 is deflected in accordance with the numbers in the X counter 10 and the Y counter 11 as well as the state of the two most significant bits from the slope register 17.

The video input to the cathode ray tube 97 is controlled from a three input video multiplexer 98 via an AND gate 99. The inputs (0), (1) and (2) of the multiplexer 98 are connected to the output thereof under control of a two bit signal from the micro controller 36 via a line 100. The input (0) is utilized during character generation and receives the video bit (bit 13) from the short vector words (FIG. 6) stored in the character memory 37. The input (1) is utilized during vector generation and receives the video bit (bit 13) from the vector command words (FIG. 6) provided by the data source 35. The input (2) is utilized during circle generation and receives a signal that renders the cathode ray tube video continuously active. The video control signals from the multiplexer 98 are enabled or disabled via the AND gate 99 by the micro controller 36 via a signal on a line 101. It is appreciated that during vector and character generation the vector (or short vector in the case of the character) is either written or blanked in accordance with the binary state of the video bit.

The character memory 37 that provides the short vector display command words (FIG. 6) is addressed by a character memory address counter 102. The starting address for a character is provided by the bits 9-0 of the character command word (FIG. 6) provided by the data source 35. This address is loaded into the counter 102 under control of the micro controller 36 by a signal on a line 103. The addresses are then incremented by unity under control of the micro controller 36 by clock pulses selectively applied to a line 104. In this manner the sequence of short vectors stored in the character memory 37 for generating the desired characters are addressed and provided to the display apparatus for the character generation control thereof. The bit 14 from the short vector words provided by the character memory 37 is applied to the micro controller 36 via a line 105 to provide an end of character signal (EOC) to the micro controller 36, so that appropriate action can be effected at the end of the generation of a particular character. As is appreciated, the last short vector word utilized in the generation of a character has a binary one inserted into the EOC bit 14 to provide this signal.

The micro controller 36 provides an advance signal to the data source 35 via a line 106 to advance the sequential fetching of the sequence of display command words for generating the particular desired display frames comprised of vectors, circular curves and characters. When the end of a display sequence is attained as indicated by the end of message word, the micro controller 36 resets the data source 35 by a signal via a line 107.

Thus it is appreciated that sequences of display command words of the format illustrated in FIG. 6 are stored in the data source 35 for providing particular desired display pictures. In a similar manner the various characters to be utilized are stored via sequences of short vector words in the character memory 37 which characters are then addressed via the counter 102.

Figure 7:
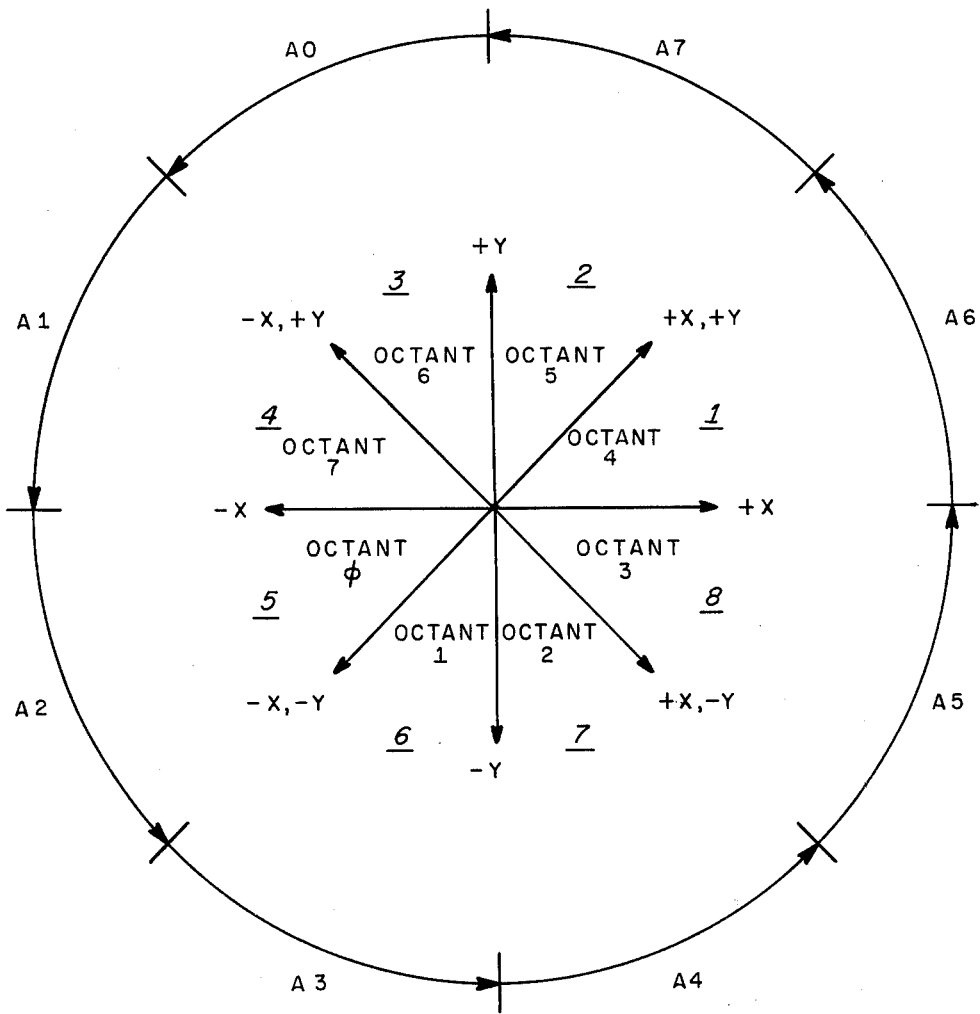
FIG. 7 is a chart depicting the relationship between octant counter values, X and Y up/down counter directions and circle arc segments with respect to FIG. 5.
Figure 5A:
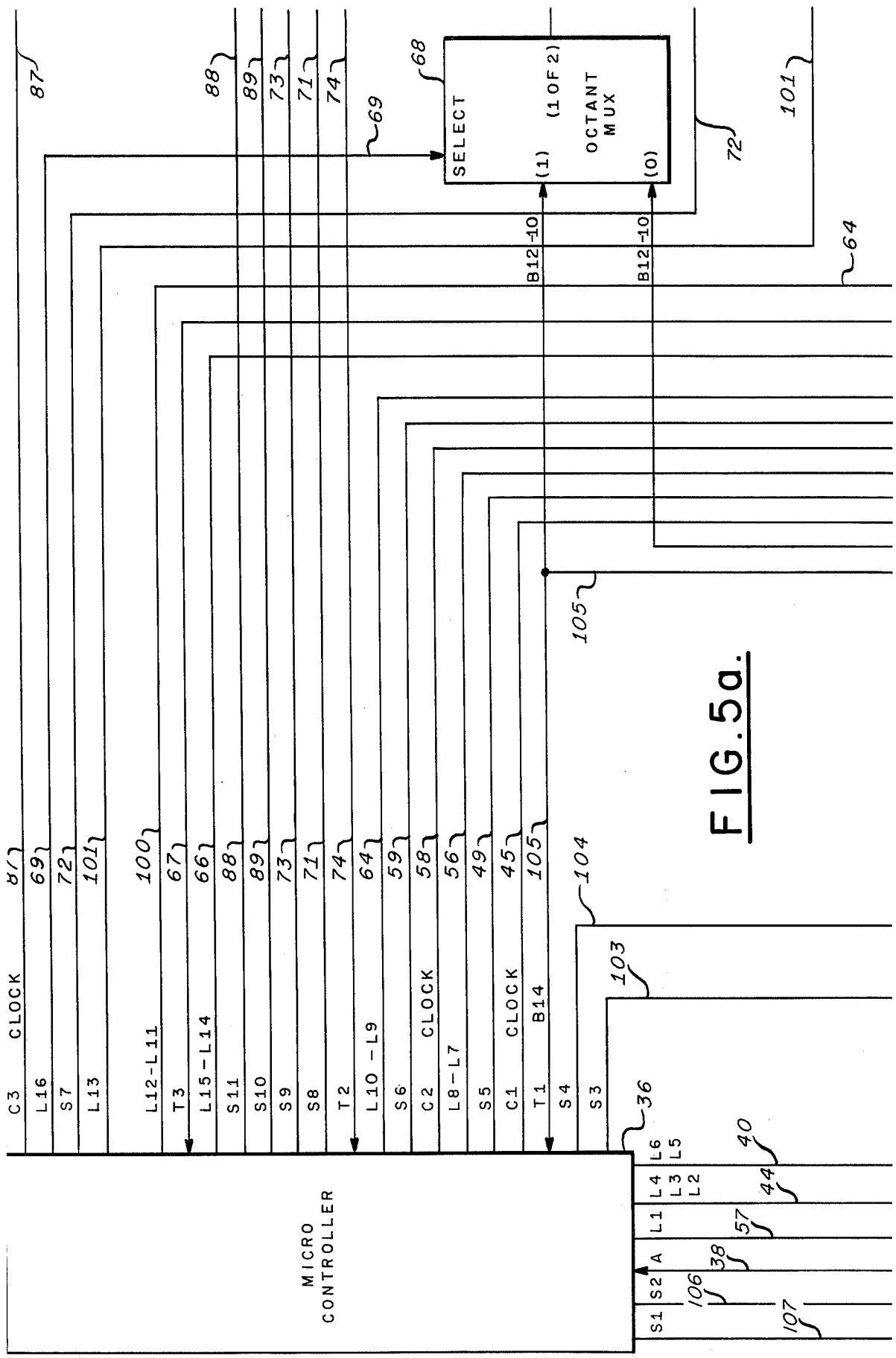
FIG. 5 comprised of FIGS. 5a, 5b, 5c and 5d, is a detailed schematic block diagram of the preferred embodiment of the invention integrating the generation of vectors, circular curves and characters. The details of the display resolution enhancement apparatus are also illustrated.
Figure 5B:
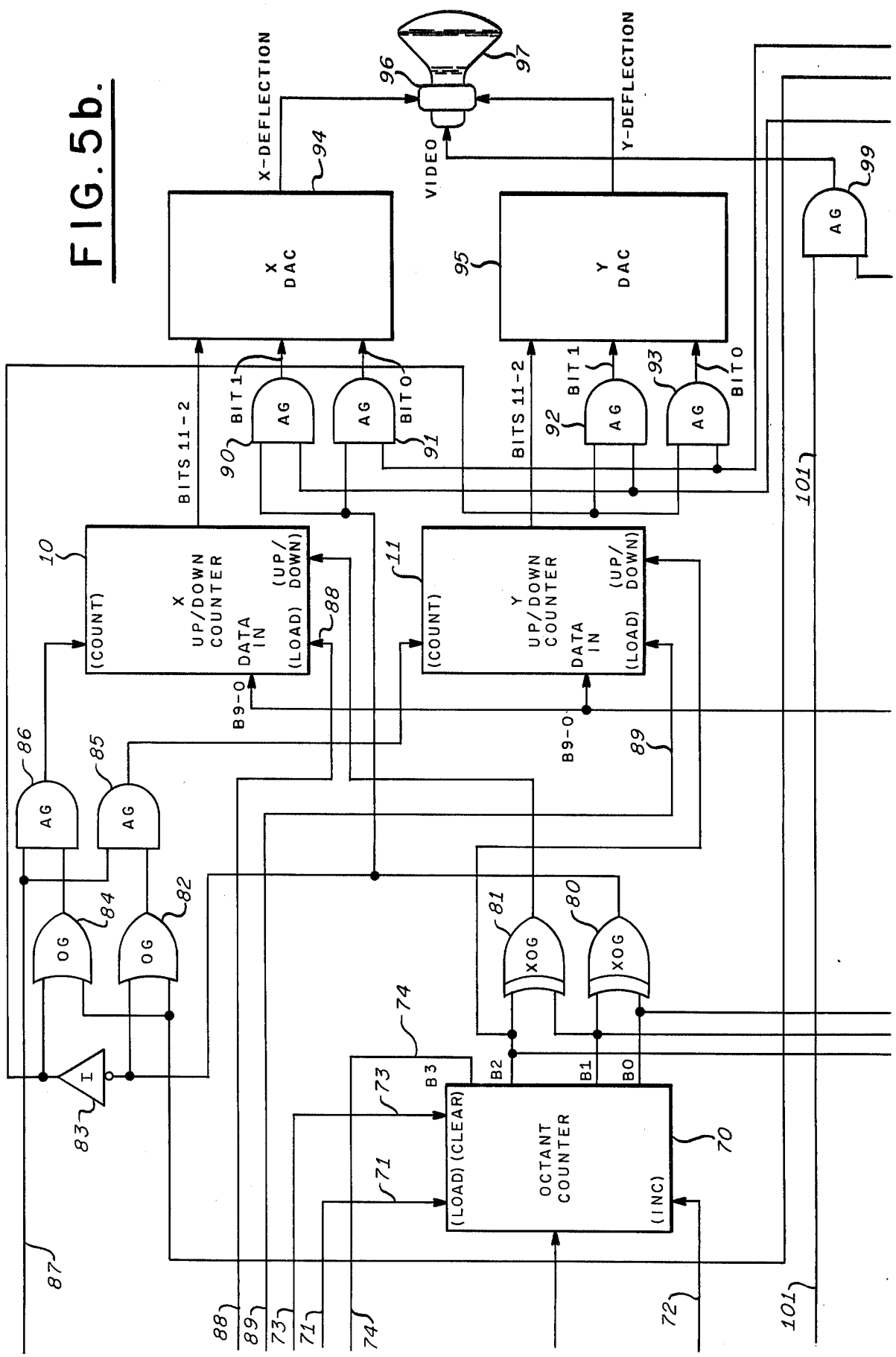
Figure 5C:
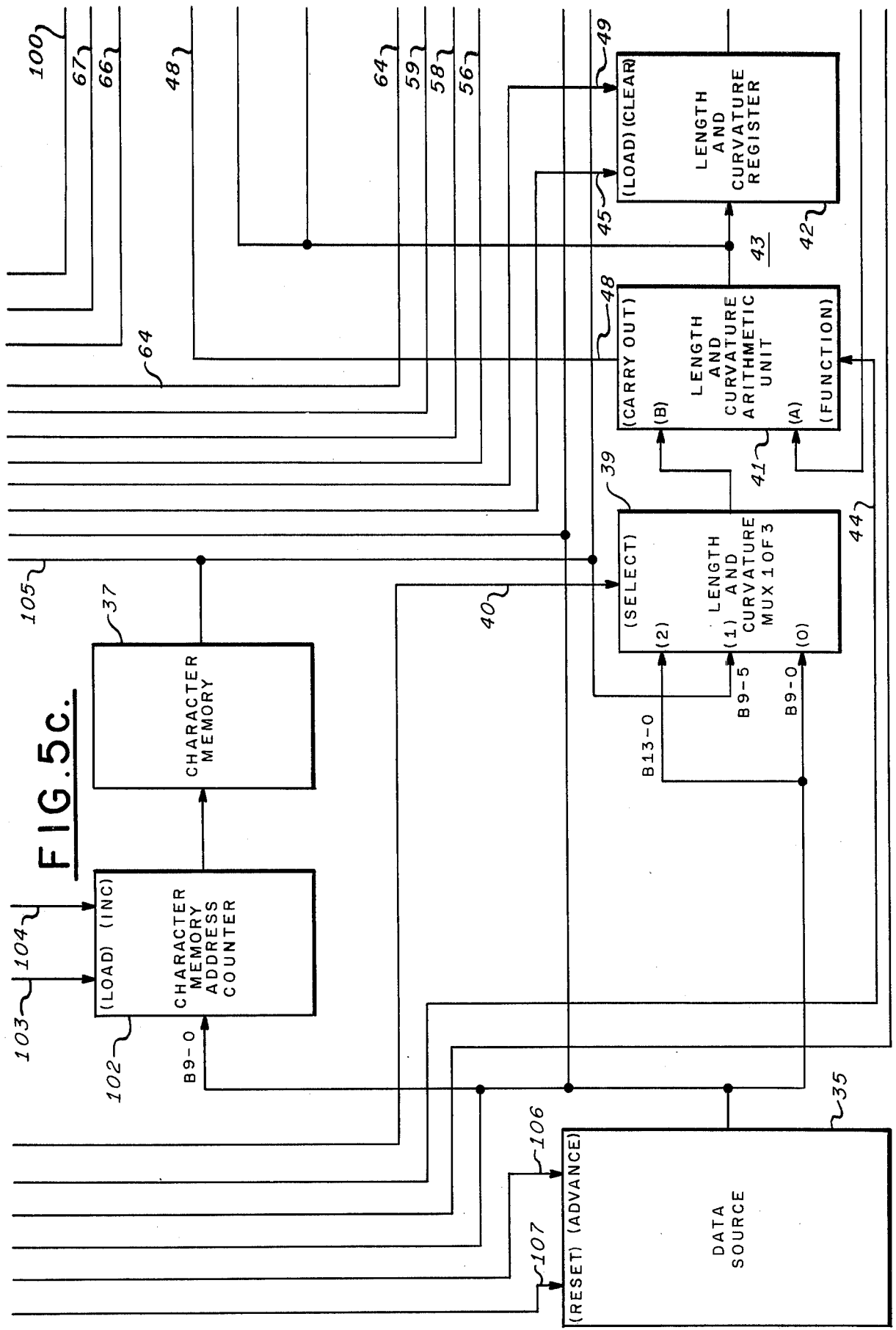
Figure 5D:
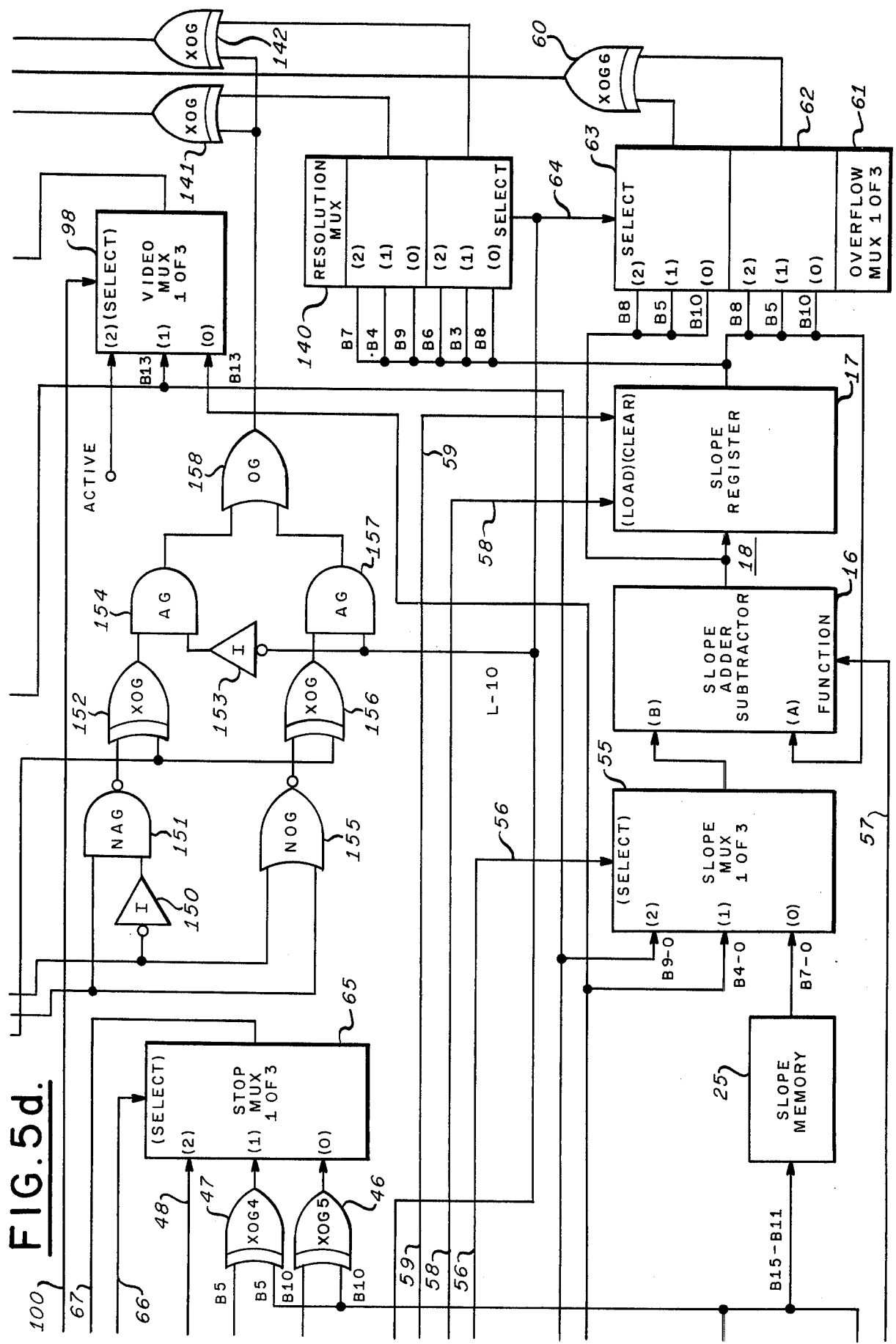

Referring for the moment to FIG. 7, a diagram depicting the relationship between the values of the octant counter 70, the counting directions of the counters 10 and 11 and the arc segments of the circle being generated is illustrated. For purposes of vector and short vector generation the octant counter stores the number indicated by the legend "octant". The counting directions for the counters are indicated at the octant boundaries by the signed letters X and Y. For circle generation the octant counter 70 stores the number associated with the particular arc being generated. For example, when arc 0 (A0) is generated, the octant counter 70 stores the number 0. When the arc 1 (A1) is generated, the octant counter is advanced to store the number 1. Similarly, the octant counter is advanced for each of the arc segments A2-A7 illustrated. For convenience, the underscored numbers associate the octant with the octant number designation utilized hereinabove in the discussion with respect to Tables 1 and 2 and FIGS. 2 and 4.

Referring back to FIG. 5, the detailed block diagram of the display depicting the data and control signal paths required for the execution of the display commands of FIG. 6 is illustrated. In operation, the microcontroller 36 senses the function code portion of the 16-bit data source word from the data source 35 and responds by generating the appropriate control signals to set up data paths, transfer data or change the state of counters. The micro controller 36 then advances the data source 35 via the line 106 to the next sequential word and repeats the above operation until an end of message command is encountered. At this time the micro controller 36 resets the data source 35 via line 107 to the initial word of the display message in preparation for the next display frame.

The following is a detailed description of the functions performed by the apparatus of FIG. 5 in response to each of the display commands of FIG. 6. It is assumed that, at the end of each command sequence, the data source 35 is advanced by the micro controller 36.

Initialize X Position

From the information contained in bits 15-10 of the data source 35, the micro controller 36 determines that the X counter 10 is to be initialized. Data source bits 9-0 are presented to the parallel data inputs of the X and Y counters 10 and 11 so that command completion is accomplished when the micro controller strobes the load input of the X up/down counter 10.

Initialize Y Position

This is the same as for the above described X command except that the micro controller 36 strobes the load input of the Y up/down counter 11.

Vector Generation

The micro controller 36 configures the function control line 44 of the length and curvature arithmetic unit 41 so that the data at the (B) input is transferred to the output. At the same time, the micro controller 36 sets the length and curvature MUX 39 select line 40 so that data souce bits 9-0 are presented to the length and curvature arithmetic unit 41 (B) input and then the micro controller 36 strobes the length and curvature register load control line 45. This operation results in data source bits 9-0 being transferred to bits 9-0 of the length and curvature register 42. The micro controller 36 now strobes the data source "advance" input 106 which accesses the second word of the two-word vector command. To complete the preparation prior to vector generation, the micro controller 36 performs the following operations:
 1. Set the octant MUX 68 to select input (0).
 2. Load the octant counter 70.
 3. Set the overflow MUX 61 and the resolution MUX 140 to inputs (0).
 4. Clear the slope register 17.
 5. Set the slope adder/subtracter 16 to add.
 6. Set the slope MUX 55 to select input (2).
 7. Set the length and curvature arithmetic unit 41 to minus 1.
 8. Set the stop MUX 65 to input (0).
 9. Set the video MUX 98 to input (1).

The display is now ready for the step-by-step execution of the specified vector. The micro controller 36 applies an enable to AND gate 99 via line 101 and a periodic clock strobe (Δt) to the inputs of AND gates 85 and 86, slope register load line 58 and length register load line 45 and monitors the output line 67 of the stop MUX 65. When the stop MUX output goes to the active state, the micro controller 36 disables all strobes and the AND gate 99 enable thereby terminating the command.

During symbol generation, the counting direction of the X and Y up/down counters 10 and 11 are controlled by EXCLUSIVE OR gate 81 and octant counter bit 2 respectively while counting rate is controlled by AND gate 86 and AND gate 85 respectively. The X up/down counter 10 is incremented by one for each output pulse of AND gate 86 when the octant counter contains values of 2, 3, 4 and 5. For octant counter values of 0, 1, 6 or 7, the X up/down counter 10 is decremented by one. The Y up/down counter 11 is incremented for octant counter values of 4, 5, 6 or 7 and is decremented for values of 0, 1, 2 and 3 (see FIG. 7). Counting rate is also dependent on the contents of the octant counter 20 via EXCLUSIVE OR gate 80, Inverter 83, OR gate 84, OR gate 82, AND gate 86 and AND gate 85. For octant counter values of 0, 3, 4 or 7, the X up/down counter 10 is updated for only a coincidence of the micro controller 36 clock strobe and slope register overflow as indicated by EXCLUSIVE OR gate 60. For octant counter values of 1, 2, 5 or 6, the counting rates of the X and Y up/down counters 10 and 11 are interchanged.

The stop MUX 65 output for vector generation is controlled by EXCLUSIVE OR gate 46 which is activated by a sign difference between the length register 42 and the length arithmetic unit 41, i.e., the length register 42 contains zero and the output of the length arithmetic unit 41 is minus one.

Character Generation

Predefined symbols such as alphanumerics and punctuation marks are generated as a series of short concatanated vectors. A data source command word that specifies character generation causes the micro controller 36 to initialize the character memory address counter and then utilize the character memory output as vector specifications for the entire symbol. An active end-of-character flag, contained in the last vector word of every symbol, causes the micro controller 36 to obtain the next sequential command from the data source 35. To generate a character, the micro controller 36 performs the following operations:
 1. Set the slope adder/subtracter 16 to add.
 2. Set the slope MUX 55 to input (1).
 3. Set the overflow MUX 61 and the resolution MUX 140 to inputs (1).
 4. Set the stop MUX 65 to input (1).
 5. Set the video MUX 98 to input (0).
 6. Set the octant MUX 68 to input (1).
 7. Set the length MUX 39 to input (1).
 8. Load the character memory address counter 102.
 9. Clear the slope register 17.
 10. Load the octant counter 70.
 11. Set the length arithmetic unit 41 to input (B).
 12. Load the length register 42.
 13. Set the length arithmetic unit 41 to (A) minus 1.
 14. Enable AND gate 99 and apply periodic clock strobes to AND gate 86, AND gate 85, slope register load line 58 and length register load line 45 until the stop MUX 65 output goes active.
 15. Disable all clock strobes and the AND gate 99 enable. If the character memory end-of-character bit is active, terminate the character sequence; if not proceed to Step 16.
 16. Increment (Inc) the character memory address counter 107 by one.
 17. Repeat Steps 9 through 15.

Circle Generation

The display generates circles as a group of eight identical arcs as shown in FIG. 7. Circle generation begins and ends at the junction of ARc 0 (A0) and Arc 7 (A7).

The octant counter value controls the arc segment being generated; the octant counter contains a zero while A0 is generated, a one while A1 is generated, etc. During circle generation, the length and curvature register 42 is accumulating curvature information in the form of K/radius from the data source 35 which is transformed to slope information by the slope memory 25. Slope memory output is accumulated in the slope register 17 which results in the counting rate signals for the X and Y up/down counters 10 and 11. The micro controller 36 circle generation sequence is as follows:

1. Clear the octant counter 70.
2. Set the video MUX 98 to Input (2) continuously active.
3. Set the stop MUX 65 to Input (2).
4. Set the overflow MUX 61 and the resolution MUX 140 to Inputs (2).
5. Clear the slope register 17.
6. Set the slope MUX 55 to Input (0).
7. Clear the length register 42.
8. Set the length MUX 39 to Input (2).
9. Set the slope adder/subtracter 16 to add.
10. Set the length and curvature arithmetic unit 41 to add.
11. Enable AND gate 99 and apply periodic clock strobes to AND gate 86, AND gate 85, slope register load line 58 and length and curvature register load line 45.
12. When the stop MUX 65 goes active (length and curvature register overflow), disable AND gate 99 and terminate all periodic clock strobes.
13. Increment (Inc) the octant counter 70 by one.
14. Set the slope adder/subtracter 16 to subtract. (A minus B).
15. Set the length and curvature arithmetic unit 41 to subtract. (A minus B)
16. Enable AND gate 99 and apply periodic clock strobes to AND gate 86, AND gate 85, slope register load line 58 and length and curvature register load line 45.
17. When the stop MUX 65 goes active (length and curvature register underflow), disable AND gate 99 and terminate all periodic clock strobes).
18. Increment the octant counter 70 by one.
19. If the octant counter 70 contains a count of eight (octant counter B3=1) terminate circle generation; if not, repeat Steps 9 through 19.

On the first pass through the above sequence, Step 11 generates A0 of FIG. 7 and Step 16 generates A1. On the second pass, A2 and A3 are generated. After the fourth pass, the circle is completed and the micro controller 36 returns to the data source 35 for the next command.

Resolution Enhancement

In displays such as that illustrated in FIG. 5 that utilize counters and analog to digital converters to generate deflection signals, the cathode ray tube beam writing rate is determined by the rate at which the counters are updated, multiplied by the distance the beam moves during each counter update ($dX/dt\ dt$ or $dY/dt\ dt$). The upper limit of the counter update rate is primarily determined by the digital-to-analog converter settling time. The cost of a digital-to-analog converter increases very rapidly with decreased settling time. The lower limit is established by the amount of information to be written in a given period. If it is desirable to increase either the writing rate or the resolution, the resolution enhancement technique of the present invention may be utilized.

Figures 8A, 8B:
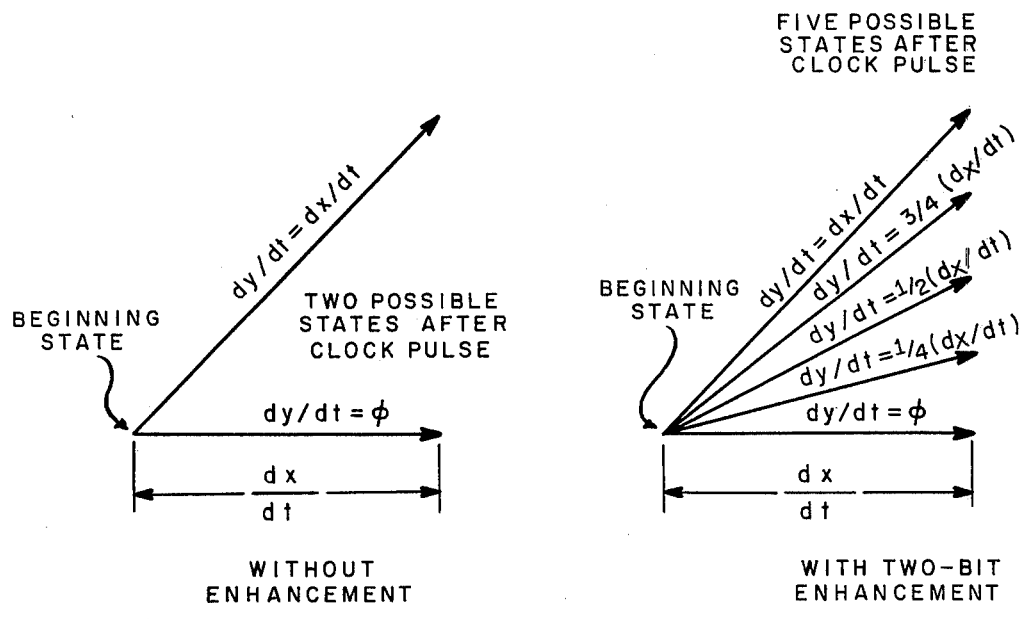
FIG. 8 comprised of FIGS. 8a and 8b, is a graph illustrating parameters useful in explaining the display resolution enhancement concept of the present invention.

Referring to FIG. 8, the concept of resolution enhancement in terms of micro-vector segments is illustrated. It is appreciated that without enhancement there are only two possible states after a clock pulse whereas with 2-bit enhancement one of five possibilities exist. Since $dX/dt$ is the same in both instances and the size of $dY/dt$ is one-fourth as large with enhancement, resolution has been increased by a factor of four. Conversely, if writing rate is to be increased by a factor of four with resolution remaining constant, $dX/dt$ would be increased by a factor of four while 2-bit enhancement maintains resolution at its original 2-bit value. Many combinations of writing rate/resolution increase may be effected.

Referring to FIGS. 2, 4 and 5, FIGS. 2 and 4 illustrate two inputs to the Y DAC, one provided by the Y integer counter 11 and the other provided by the Y fractional register 17. Since overflows from the slope accumulator 18 increment the Y counter 11, the counter 11 acts as an extension of the register 17. Thus utilizing a DAC that is longer than the Y counter and providing the least significant DAC bits from the Y register 17, the resolution enhancement illustrated in FIG. 8 is effected.

Referring specifically to FIG. 5, the AND gates 90-93 are utilized as the resolution enhancement control gates. AND gates 90 and 91 are enabled by the output of the EXCLUSIVE OR gate 80 when the X up/down counter clock strobes are controlled by the slope accumulator 18. Under this condition the two most significant bits from the slope register 17 as selected by the multiplexer 140 and controlled by the gates 141 and 142 are transmitted to the two least significant bits of the X DAC 94 through the gates 90 and 91 respectively while the two least significant bits of the Y DAC 95 are forced to zero by reason of the disablement of the gates 92 and 93 via the output of the EXCLUSIVE OR gate 80 inverted by the inverter 83. Similarly, when the Y up/down counter clock strobes are derived from the slope accumulator 18, the least significant bits of the Y DAC 95 are driven by the slope register 17 and the least significant bits of the X DAC 94 are forced to zero.

For a 2-fold increase in writing rate with no decrease in resolution, the X and Y up/down counters 10 and 11 are changed from 10-bit to 9-bit counters that would then drive DAC bits 11 through 3 and the two resolution control gates would be increased to three to drive the DAC bits 2-0.

It will be appreciated from the foregoing that the present invention provides a digital stroke display with a capability of generating vectors, circles, circle segments as well as characters. High quality circles and circle segments of any radius may be provided. The display operates at a high speed since circle generation proceeds at the same rate as vector and character generation. The circle generation capability is included with only a nominal increase in hardware complexity over that required for vectors and characters. Registration and drift problems are minimized since the vector, character and circle generation is digital and utilizes the same hardware. The vector, character and circle control specifications all require a minimum of information.

It will be appreciated from the foregoing that the slope accumulator effectively multiplies the clock pulse train by the slope M where the clock pulse train controls the writing rate along one axis and the multiplied clock pulse train controls the writing rate along the other axis. It will also be appreciated that a binary rate multiplier may be utilized to perform this function.

Although the present invention was described in terms of a cathode ray tube display, it will be appreciated that the invention has application in other types of displays. For example, the invention may be utilized in a flat tube display as well as in a display having deflection mechanisms directly utilizing digital inputs. Additionally, the invention may be utilized in an X-Y plotter as well as in non-display applications such as numerically controlling machining apparatus.

Referring again to FIG. 5, the micro controller 36 was described in terms of providing a plurality of strobes and control signals to the components of the display to effect the detailed operations discussed hereinabove with respect to vector, circle and character generation. It will be appreciated that conventional discrete analog or digital circuits may be utilized in providing the described signals. For example, in response to the function code signal on the line 38, the micro controller 36 may include decoding circuitry to provide discrete signals in accordance with the functions to be performed as described above with respect to the function code fields of the macro instruction words of FIG. 6. Appropriate sequencing circuits, latches and clock circuits may be readily derived to provide the described signals.

Figure 9A:
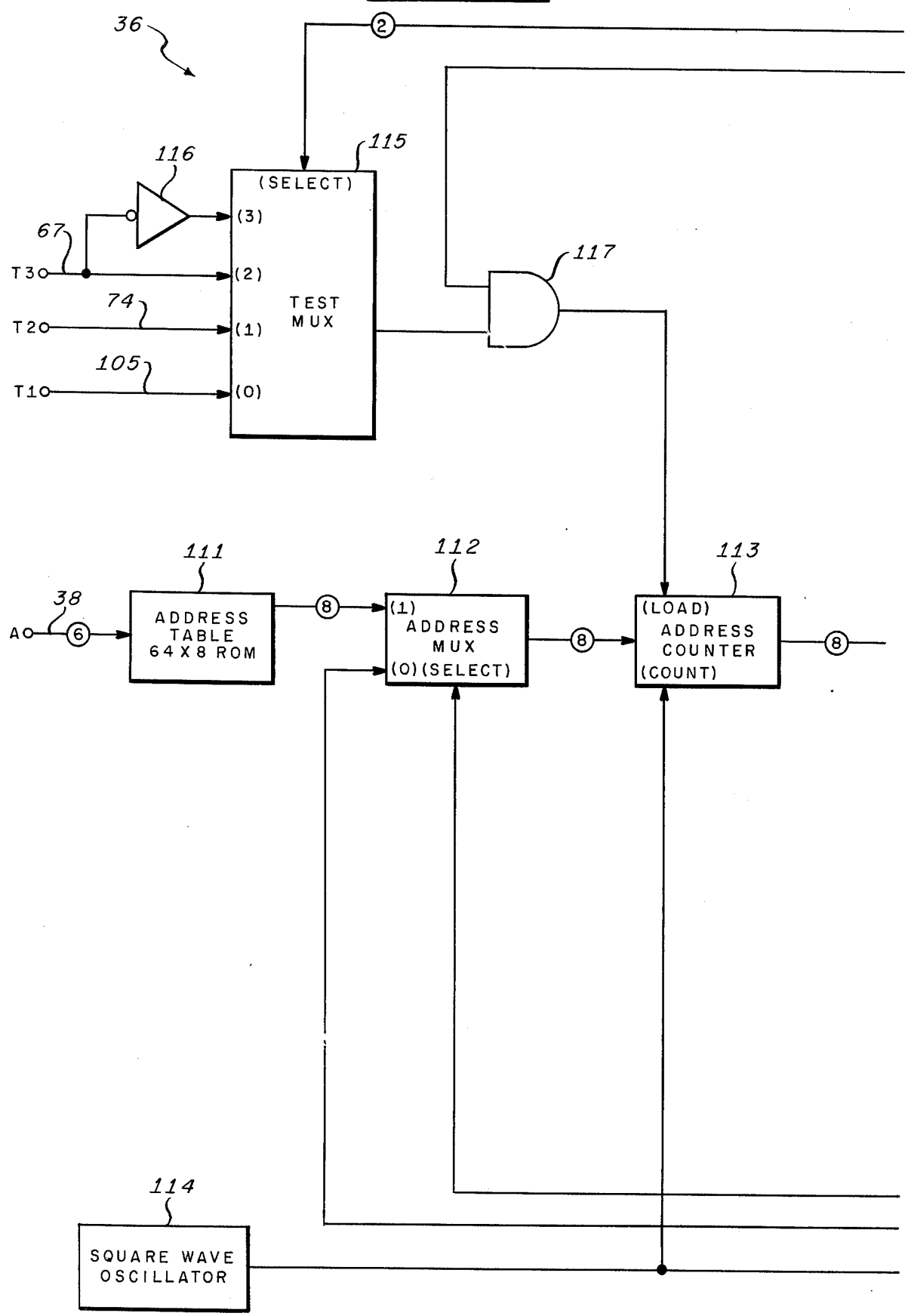
FIG. 9 comprised of FIGS. 9a and 9b, is a block schematic diagram of the micro controller 36 of FIG. 5.
Figure 9B:
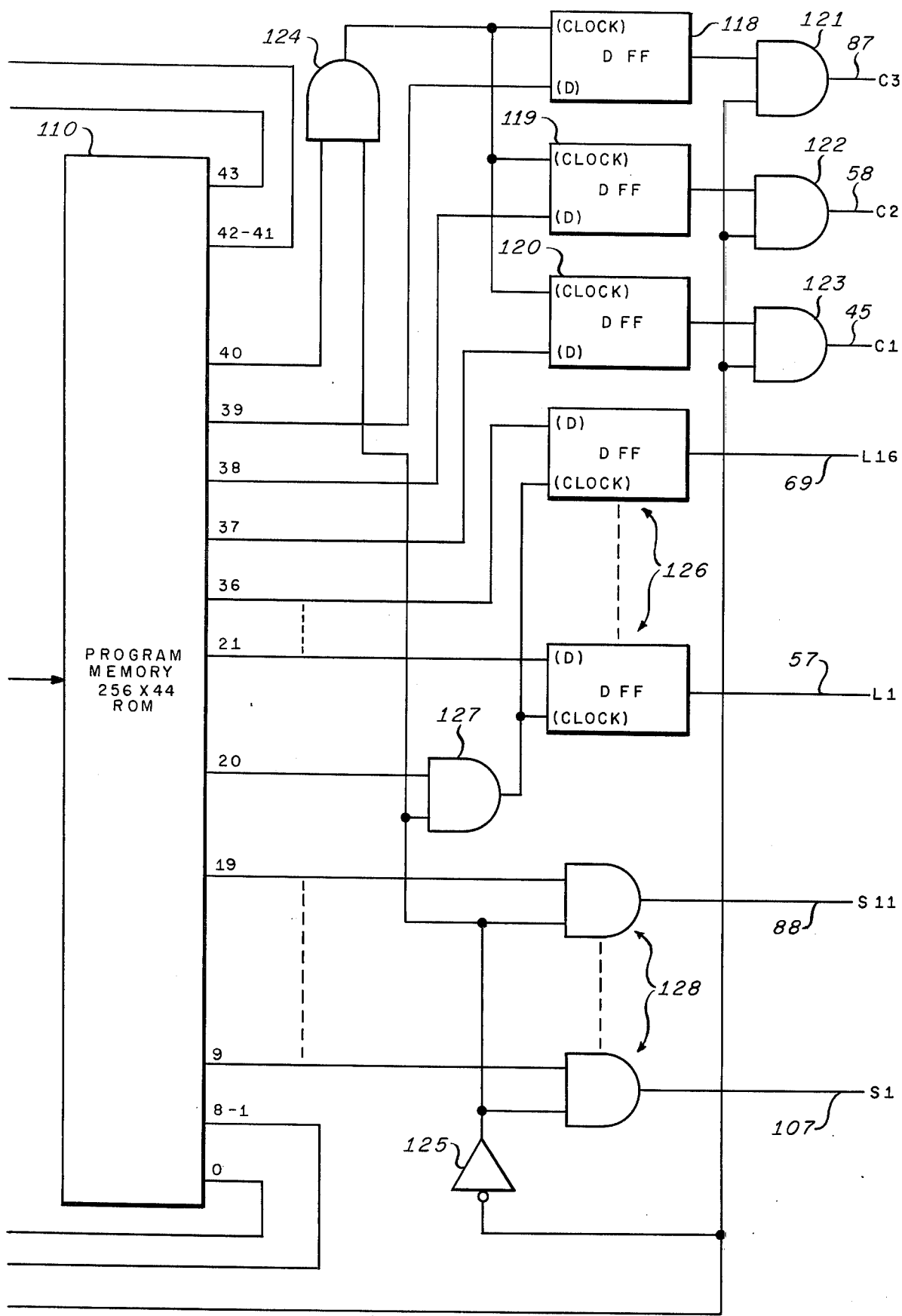

Referring to FIG. 9 in which like reference numerals indicate like components with respect to FIG. 5, a preferred micro controller for use in the apparatus of FIG. 5 is illustrated. The micro controller 36 includes a program memory 110 for storing the micro routines for controlling the display functions of initializing the X and Y positions, for generating vectors, characters and circles and for providing an end of message routine. The memory 110 is preferably implemented by a rom that has the capacity for storing 256 44-bit words. The program to be described hereinafter for controlling the display of FIG. 5 requires, however, only 65 words, the remaining capacity providing memory space for additional functionality. As noted in FIG. 5, each of the control lines exiting or entering the micro controller 36 has a C, S, L, T or A legend associated therewith. These lines correspond to the clocks, strobes, latches, test inputs and address inputs respectively that are provided by or received by the micro controller 36. The micro controller 36 receives the 6-bit function code on the A line as well as the 3 test signals designated as T1-T3. The micro controller 36 provides eleven strobe signals S1-S11, sixteen latch signals L1-L16 and three clock signals C1-C3. The 6-bit address signal on the line 38 is applied to an address table 111 which comprises a rom for storing 64 8-bit words which are utilized as the starting addresses for the display generation routines stored in the program memory 110. The signals on the line 38 are utilized to address the rom 111 so as to provide the addressed word at its output. The following Table 3 delineates the contents of the rom 111.

TABLE 4

| Address | Data<br>7 6 5 4 3 2 1 0 | Comment |
|---|---|---|
| 0 | 0 0 0 0 0 0 1 0 | Initialize X Position |
| 1 | 0 0 0 0 0 1 0 0 | Initialize Y Position |
| 2 | 0 0 0 0 0 1 1 0 | Vector |
| 3 | 0 0 0 1 0 1 1 0 | Character |
| 4 | 0 0 1 1 1 1 1 1 | End of Message |

TABLE 4-continued

| Address | Data<br>7 6 5 4 3 2 1 0 | Comment |
|---|---|---|
| 5 | | |
| 6 | | |
| 7 | | |
| 8 | | |
| 9 | | |
| 10 | | |
| 11 | | |
| 12 | | |
| 13 | | |
| 14 | | |
| 15 | | |
| 16 | 0 0 1 0 1 0 1 0 | Circle |
| 17 | 0 0 1 0 1 0 1 0 | |
| 18 | 0 0 1 0 1 0 1 0 | |
| 19 | 0 0 1 0 1 0 1 0 | |
| 20 | 0 0 1 0 1 0 1 0 | |
| 21 | 0 0 1 0 1 0 1 0 | |
| 22 | 0 0 1 0 1 0 1 0 | |
| 23 | 0 0 1 0 1 0 1 0 | |
| 24 | 0 0 1 0 1 0 1 0 | |
| 25 | 0 0 1 0 1 0 1 0 | |
| 26 | 0 0 1 0 1 0 1 0 | |
| 27 | 0 0 1 0 1 0 1 0 | |
| 28 | 0 0 1 0 1 0 1 0 | |
| 29 | 0 0 1 0 1 0 1 0 | |
| 30 | 0 0 1 0 1 0 1 0 | |
| 31 | 0 0 1 0 1 0 1 0 | Circle |
| 32 | | |
| , | | |
| , | | |
| 63 | | |

Although the addresses of the rom 111 are shown for convenience in decimal form, it is appreciated that the equivalent six digit binary address provided on the six conductor line 38 addresses the 65 locations as illustrated. The address Table 111 in effected decodes the incoming macro instructions providing a unique 8-bit address word output for each of the display macro codes discussed above with respect to FIG. 6.

The 8-bit program memory address provided by the address table rom 111 is applied as an input to an address multiplexer 112, the other input of which is provided by bits 8-1 from the 44-bit wide program memory 110. The selection signal for the multiplexer 112 is provided by bit 0 from the program memory 110. Thus, when bit 0 from program memory 110 is in the 0 state, the address multiplexer 112 connects the (0) input of the multiplexer 112 to its output. When the bit 0 from the program memory 110 is in the 1 state, the input (1) of the multiplexer 112 is connected to its output. Thus bit 0 of the program memory 110 controls whether the program memory 110 will be addressed in accordance with an internally provided address stored in its bits 8-1 field or from the address table 111.

The 8-bit address signal from the multiplexer 112 is applied to an 8-bit address counter 113 as a preset therefor that is loaded into the counter 113 by a signal applied to its load input. The 8-bit output of the address counter 113 is applied as the address input to the program memory 110 for addressing the 44-bit words stored therein so as to provide the 44-signals from the memory 110 in accordance with the addressed word. The address counter 113 is incremented by clock signals from the square wave oscillator 114. Thus, when the address counter 113 is loaded with the starting address of a routine stored in the program memory 110, the sequential micro instructions of the routine are thereafter sequentially addressed so as to control the performance of the sequence of operations commanded by the routine.

The test leads 67, 74 and 105 applied to the micro controller 36 are utilized as inputs to a 4 input test multiplexer 115. The T1-T3 signals are applied to three of the four inputs respectively and the T3 input is applied via an inverter 116 to the fourth input. The select input to the multiplexer 115 is provided by bits 42-41 from the program memory 110. The output of the multiplexer 115 is applied to the load control of the address counter 113 via an AND gate 117. The AND gate 117 is enabled by the bit 43 from the program memory 110. Thus, the program memory 110 controls which of the test signals T1-T3 is applied to the AND gate 117 and additionally controls when the selected test signal is applied to load the counter 113 with the address provided by the address multiplexer 112. Thus, the program memory 110 controls it selective addressing in accordance with the test signals T1-T3 provided by the display apparatus components of FIG. 5.

The output bits 39-37 are applied to the D inputs of clock control D flip-flops 118-120 respectively. The outputs of the flip-flops 118-120 are applied to control respective clock AND gates 121-123. The basic clock signal from the oscillator 114 is applied as an input to each of the gates 121-123 to provide the controlled clock signals C3-C1 as required. The clock control information provided by the bits 39-37 from the program memory 110 is strobed into the flip-flops 118-120 by a signal from an AND gate 124 which is controlled by bit 40 of the program rom 110. The timing of the strobe signal from the AND gate 124 is provided by the oscillator 14 via an inverter 125.

The 16 latch signals L16-L1 are provided by 16 D flipflops 126 that receive their information from the respective bits 36-21 from the program rom 110. The strobing of the latch information into the flip-flops 126 is controlled by bit 20 from the program rom 110 via an AND gate 127 which receives its strobe timing signal from the oscillator 114 via the inverter 125.

The eleven strobe signals S11-S1 generated to control the display apparatus of FIG. 5 are provided via AND gates 128 under control of the respective bits 18-9 from the program rom 110. The strobes are provided through the respectively controlled gates 128 from the oscillator 114 via the inverter 125.

For convenience the following Table 4 delineates the assignments of the output bits from the program rom 110 with respect to the control utilization in FIG. 5 along with the control signal designators illustrated by the legends on FIGS. 5 and 9.

TABLE 5

| Memory Bit | Designator | Utilization |
|---|---|---|
| 43 | — | Test MUX Enable |
| 42 | — | "    " Select MSB |
| 41 | — | "    "   "1 LSB |
| 40 | — | Clock Load |
| 39 | C3 | Clock 3 - Up/down counter clock |
| 38 | C2 | "    2 - Slope register clock |
| 37 | C1 | "    1 - Length register clock |
| 36 | L16 | Latch 16 - Octant MUX select |
| 35 | L15 | "    15 - Stop MUX select MSB |
| 34 | L14 | "    14 - " " LSB |
| 33 | L13 | "    13 - Video enable |
| 32 | L12 | "    12 - Video MUX select MSB |
| 31 | L11 | "    11 - " " " LSB |
| 30 | L10 | "    10 - Overflow MUX select MSB |
| 29 | L9 | "    9 - " " " LSB |
| 28 | L8 | "    8 - Slope MUX select MSB |
| 27 | L7 | "    7 - " " " LSB |
| 26 | L6 | "    6 - Length MUX select MSB |
| 25 | L5 | "    5 - " " " LSB |

TABLE 5-continued

| Memory Bit | Designator | Utilization |
|---|---|---|
| 24 | L4 | "    4 - Length arith. Unit select MSB |
| 23 | L3 | "    3 - " " " " |
| 22 | L2 | "    2 - " " " " LSB |
| 21 | L1 | "    1 - Slope adder/ subtracter select |
| 20 | — | Latch Load |
| 19 | S11 | Strobe 11 - X up/down-counter load |
| 18 | S10 | "    10 - Y " " " " |
| 17 | S9 | "    9 - Octant-counter clear |
| 16 | S8 | Strobe 8 - Octant- counter load |
| 15 | S7 | "    7 - " " increment |
| 14 | S6 | "    6 - Slope register clear |
| 13 | S5 | "    5 - Length register clear |
| 12 | S4 | "    4 - Char.mem. address counter-incr. |
| 11 | S3 | "    3 - " " " " - load |
| 10 | S2 | "    2 - Data source advance |
| 9 | S1 | "    1 - Data source reset |
| 8 | — | μ-controller address bit 7 |
| 7 | — | " " " 6 |
| 6 | — | " " " 5 |
| 5 | — | " " " 4 |
| 4 | — | " " " 3 |
| 3 | — | " " " 2 |
| 2 | — | " " " 1 |
| 1 | — | " " " 0 |
| 0 | — | address MUX Select |

Figure 10B:
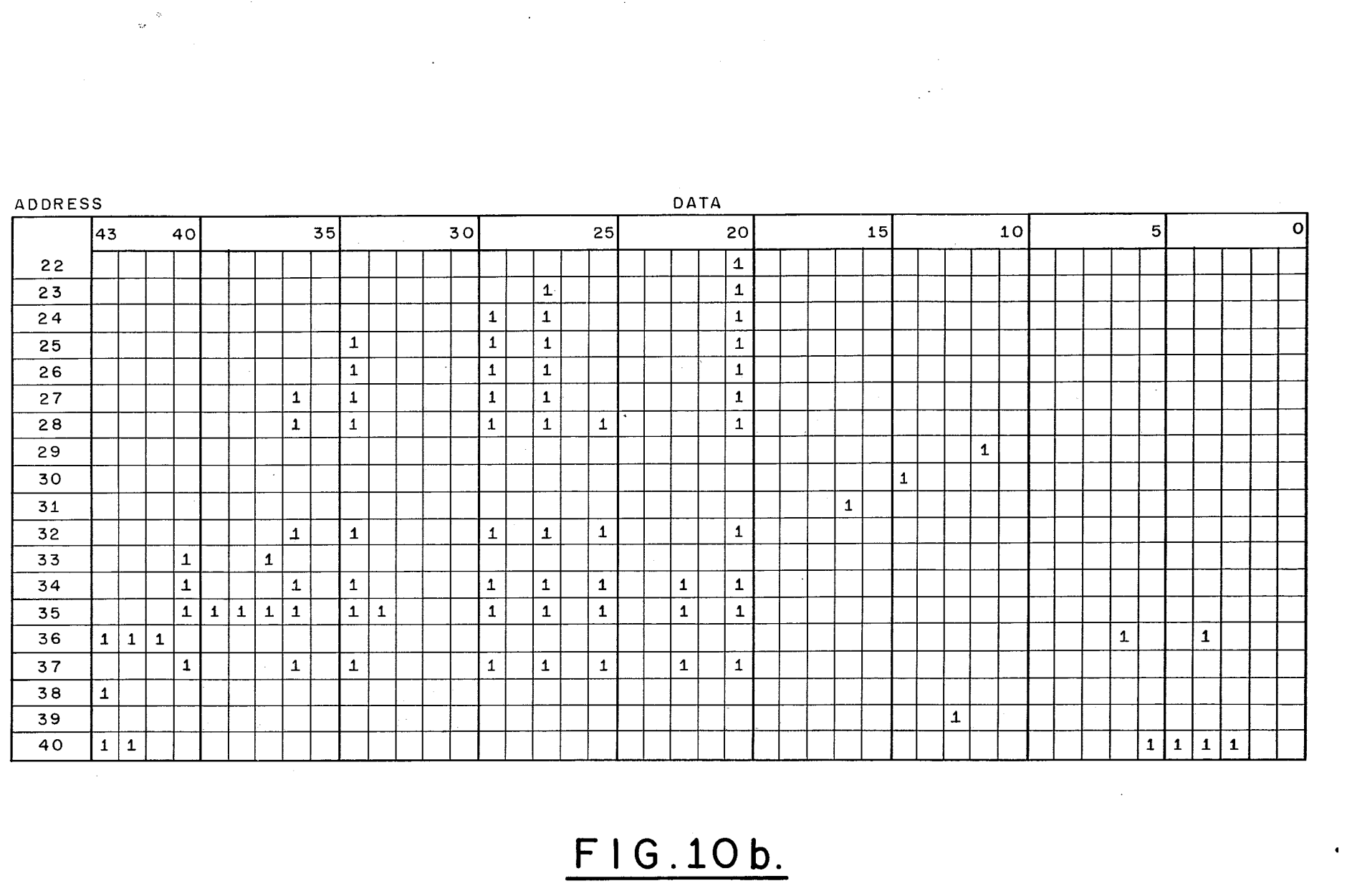

Referring now to FIG. 10 which is comprised of FIGS. 10a-10c, the contents of the program rom 110 required to perform the various sequences of operations discussed hereinabove is illustrated. The memory addresses are shown in decimal for convenience. The following Table 6 indicates the locations in the rom 110 for the various display generation sequences and indicates the operations performed by the micro instructions of the routines.

TABLE 6

| Address | Comments |
|---|---|
|  | Read Next Instruction (RNI) Sequence |
| 0 | Advance data source |
| 1 | Jump to appropriate sequence |
|  | Initialize X Position Sequence |
| 2 | Load X up/down counter |
| 3 | Jump to RNI |
|  | Initialize Y Position Sequence |
| 4 | Load Y up/down counter |
| 5 | Jump to RNI |
|  | Vector Sequence |
| 6 | B9-D presented to length register |
| 7 | Load length register |
| 8 | Advance data source |
| 9 | Set octant MUX to input 0 |
| 10 | Load octant counter |
| 11 | Set overflow MUX to input 0 |
| 12 | Clear slope register |
| 13 | Slope adder/subtracter to add |
| 14 | Set slope MUX to input 2 |
| 15 | Set length arithmetic unit to A-1 |
| 16 | Set stop MUX to input 0 |
| 17 | Set video MUX to input 1 |
| 18 | Enable video and periodic strobes |
| 19 | Stop MUX active? No ↓ Yes |
| 20 | Disable video and periodic strobes |
| 21 | Jump to RNI |
|  | Character Sequence |
| 22 | Slope adder/subtracter to add |
| 23 | Slope MUX to input 1 |
| 24 | Overflow MUX to input 1 |
| 25 | Stop MUX to input 1 |
| 26 | Video MUX to input 0 |
| 27 | Octant MUX to input 1 |
| 28 | Length MUX to input 1 |
| 29 | Load character memory address counter |
| 30 | Clear slope register |
| 31 | Load octant counter |
| 32 | Length arithmetic unit to B |
| 33 | Load length register |
| 34 | Length arithmetic unit to A-1 |
| 35 | Enable video and periodic strobes |
| 36 | Stop MUX active? No ↓ Yes |

TABLE 6-continued

| Address | Comments |
|---|---|
| 37 | Disable video and periodic strobes |
| 38 | End of character bit set? Yes N (RNI)  |
| 39 | Increment character memory address counter |
| 40 | Jump to address 30. |
| | Circle Sequence |
| 41 | Clear octant counter |
| 42 | Video MUX to input 2 |
| 43 | Stop MUX to input 2 |
| 44 | Overflow MUX to input 2 |
| 45 | Clear slope register |
| 46 | Slope MUX to input 0 |
| 47 | Clear length register |
| 48 | Length MUX to input 2 |
| 49 | Slope adder/subtracter to add |
| 50 | Length arithmetic unit to add |
| 51 | Enable video and periodic strobes |
| 52 | Stop MUX active? No Yes  |
| 53 | Disable video and periodic strobes |
| 54 | Increment octant counter |
| 55 | Slope adder/subtracter to subtract |
| 56 | Length arithmetic unit to subtract |
| 57 | Enable video and periodic strobes |
| 58 | Stop MUX active? Yes No  |
| 59 | Increment octant counter |
| 60 | Octant counter = 8? Yes No (RNI)  |
| 61 | Jump to address 49 |
| | End of Message |
| 62 | Reset data source |
| 63 | Jump to RNI |
| 64 | Jump to RNI |

In accordance with the above described firmware, the function codes required for the length and curvature arithmetic unit 41, as well as for the slope adder/subtracter 16, are provided as follows:

TABLE 7

| Length and Curvature Arithmetic Unit Codes | |
|---|---|
| Code | Function |
| 0 0 0 | Input B to output |
| 0 0 1 | A minus 1 |
| 0 1 0 | Add |
| 0 1 1 | Subtract |
| Slope adder/subtracter code | |
| Code | Function |
| 0 | Add |
| 1 | Subtract |

From the foregoing it will be appreciated that with the firmware of FIG. 10 inserted in the program memory rom 110 and with the address table 111 loaded in accordance with Table 3 above, the sequences of operations described hereinabove with respect to FIG. 5 and with respect to Table 5 will be performed by the display apparatus of FIG. 5 under control of the micro controller 36.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Digital stroke display apparatus having display tube means with a display face and writing means positionable along X and Y display axes for writing vectors with predetermined slopes and circular curves comprising a series of concatenated vectors on said display face comprising
   a source of clock pulses,
   first counter means coupled to receive said clock pulses for counting said clock pulses and providing a first digital count signal in accordance therewith,
   first positioning means responsive to said first digital count signal and coupled to said writing means for positioning said writing means along one of said axes in accordance with said first digital count signal at a first rate,
   means for providing a slope signal representative of said slope,
   multiplying means responsive to said clock pulses and to said slope signal for providing further clock pulses representative of the product therebetween,
   second counter means for counting said futher clock pulses and providing a second digital count signal in accordance therewith,
   second positioning means responsive to said second digital count signal and coupled to said writing means for positioning said writing means along the other of said axes in accordance with said second digital count signal at a rate proportional to the product of said slope and said first rate,
   said means for providing a slope signal including slope memory means for storing a plurality of slope values corresponding to said series of concatenated vectors respectively, and
   slope memory addressing means coupled to said slope memory means for addressing said plurality of slope values to provide said slope signal to said multiplying means in accordance therewith, thereby writing said circular curves.

2. The apparatus of claim 1 in which said tube means comprises cathode ray tube means having a beam and X and Y deflection means for deflecting said beam along and X and Y axes respectively.

3. The apparatus of claim 2 in which said first positioning means comprises
   first digital-to-analog converter means responsive to said first digital count signal and coupled to one of said X and Y deflection means for providing a beam deflection signal thereto.

4. The apparatus of claim 3 in which said multiplying means comprises slope accumulator means responsive to said slope signal and to said clock pulses for accumulating the value of said slope signal in response to said clock pulses and for providing overflow signals upon accumulation of a predetermined value thereby providing said further clock pulses,
   said second counter means comprises means for counting said overflow signals and providing said second digital count signal in accordance therewith, and
   said second positioning means comprises second digital-to-analog converter means responsive to said second digital count signal and coupled to the other of said X and Y deflection means for providing a beam deflection signal thereto.

5. The apparatus of claim 4 in which said multiplying means includes gating means responsive to said overflow signals and said clock pulses for gating said clock pulses to said second counter means in response to said overflow signals thereby generating said second digital count signal.

6. The apparatus of claim 5 further including means for providing an end of vector signal in accordance with the length of said vector, and clock control means responsive to said end of vector signal for controlling the transmission of said clock pulses to said first and second counter means, to said slope accumulator means and to said gating means.

7. The apparatus of claim 6 in which said means for providing an end of vector signal comprises down counter means responsive to said clock pulses for storing a number representative of one of said X and Y components of said length and for decrementing said number in accordance with said clock pulses until said number is reduced to zero, thereby providing said end of vector signal.

8. The apparatus of claim 4 including clock switching means responsive to said clock pulses and said overflow signals and coupled to said first and second counter means for selectively interchanging the application of said clock pulses and said overflow signals to said first and second counter means, whereby said slope values may be no greater than a predetermined value.

9. The apparatus of claim 8 in which said clock switching means includes octant determining means for providing a signal in accordance with the octant in which said vector lies for determining the application of said clock pulses and said overflow signals to said first and second counter means.

10. The apparatus of claim 4 in which said first and second counter means comprise first and second up/down counters respectively and said apparatus further includes direction of count control means for controlling the counting directions of said first and second up/down counters, whereby said slope values may be no greater than a predetermined value.

11. The apparatus of claim 10 in which said direction of count control means includes octant determining means for providing a signal in accordance with the octant in which said vector lies for controlling the counting directions of said first and second counter means.

12. The apparatus of claim 4 in which said slope memory addressing means comprises.
means for providing a curvature signal representative of the curvature, of said circular curves and
curvature accumulator means responsive to said curvature signal for accumulating the value thereof and providing a digital address signal to said slope memory means in accordance with the accumulated value thereof.

13. The apparatus of claim 12 in which said curvature accumulator means comprises means responsive to said clock pulses for accumulating said curvature value in response thereto.

14. The apparatus of claim 12 in which said slope accumulator means and said curvature accumulator means comprise add/subtract accumulators for controllably accumulating in an additive and subtractive manner the values applied thereto and said apparatus further includes arithmetic function control means for selecting the additive or subtractive functions performed by said slope and curvature accumulator means, whereby said slope values may be no greater than a predetermined value.

15. The apparatus of claim 14 in which said arithmetic function control means includes octant determining means for selecting said additive and subtractive functions in accordance with the octant in which the one of said concatanated vectors being drawn lies.

16. The apparatus of claim 15 including clock switching means responsive to said clock pulses and said overflow signals and coupled to said first and second counter means for selectively interchanging the application of said clock pulses and said overflow signals to said first and second counter means, whereby said slope values may be no greater than a predetermined value.

17. The apparatus of claim 16 in which said first and second counter means comprise first and second up/down counters respectively and said apparatus further includes direction of count control means for controlling the counting directions of said first and second up/down counters, whereby said slope values may be no greater than a predetermined value.

18. The apparatus of claim 17 in which said octant determining means includes means for providing a signal in accordance with the octant in which said vector being drawn lies for controlling said clock switching means for determining the application of said clock pulses and said overflow signals to said first and second counter means.

19. The apparatus of claim 18 in which said octant determining means includes means for providing a signal in accordance with the octant in which said vector being drawn lies for controlling said direction of count control means to control the counting directions of said first and second counter means.

20. The apparatus of claim 1 in which said
multiplying means comprises slope accumulator means responsive to said slope signal and to said clock pulses for accumulating the value of said slope signal in response to said clock pulses and for providing overflow signals upon accumulation of a predetermined value thereby providing said further clock pulses,
said second counter means comprises means for counting said overflow signals and providing said second digital count signal in accordance therewith.

21. The apparatus of claim 20 in which said multiplying means includes gating means responsive to said overflow signals and said clock pulses for gating said clock pulses to said second counter means in response to said overflow signals thereby generating said second digital count signal.

22. The apparatus of claim 21 further including
means for providing an end of vector signal in accordance with the length of said vector, and
clock control means responsive to said end of vector signal for controlling the transmission of said clock pulses to said first and second counter means, to said slope accumulator means and to said gating means.

23. The apparatus of claim 22 in which said means for providing an end of vector signal comprises down counter means responsive to said clock pulses for storing a number representative of one of said X and Y components of said length and for decrementing said number in accordance with said clock pulses until said number is reduced to zero, thereby providing said end of vector signal.

24. The apparatus of claim 20 including clock switching means responsive to said clock pulses and said overflow signals and coupled to said first and second counter means for selectively interchanging the application of said clock pulses and said overflow signals to said first and second counter means, whereby said slope values may be no greater than a predetermined value.

25. The apparatus of claim 24 in which said clock switching means includes octant determining means for providing a signal in accordance with the octant in which said vector lies for determining the application of said clock pulses and said overflow signals to said first and second counter means.

26. The apparatus of claim 20 in which said first and second counter means comprise first and second up/down counters respectively and said apparatus further includes direction of count control means for controlling the counting directions of said first and second up/down counters, whereby said slope values may be no greater than a predetermined value.

27. The apparatus of claim 26 in which said direction of count control means includes octant determining means for providing a signal in accordance with the octant in which said vector lies for controlling the counting directions of said first and second counter means.

28. The apparatus of claim 20 in which said slope memory addressing means comprises
means for providing a curvature signal representative of the curvature of said circular curves, and
curvature accumulator means responsive to said curvature signal from accumulating the value thereof and providing a digital address signal to said slope memory means in accordance with the accumulated value thereof.

29. The apparatus of claim 28 in which said curvature accumulator means comprises means responsive to said clock pulses for accumulating said curvature value in response thereto.

30. The apparatus of claim 28 in which said slope accumulator means and said curvature accumulator means comprise add/subtract accumulators for controllably accumulating in an additive and subtractive manner the values applied thereto and said apparatus further includes arithmetic function control means for selecting the additive or subtractive functions performed by said slope and curvature accumulator means, whereby said slope values may be no greater than a predetermined value.

31. The apparatus of claim 30 in which said arithmetic function control means includes octant determining means for selecting said additive and subtractive functions in accordance with the octant in which the one of said concatanated vectors being drawn lies.

32. The apparatus of claim 31 including clock switching means responsive to said clock pulses and said overflow signals and coupled to said first and second counter means for selectively interchanging the application of said clock pulses and said overflow signals to said first and second counter means, whereby said slope values may be no greater than a predetermined value.

33. The apparatus of claim 32 in which said first and second counter means comprise first and second up/down counters respectively and said apparatus further includes direction of count control means for controlling the counting directions of said first and second up/down counters, whereby said slope values may be no greater than a predetermined value.

34. The apparatus of claim 33 in which said octant determining means includes means for providing a signal in accordance with the octant in which said vector being drawn lies for controlling said clock switching means for determining the application of said clock pulses and said overflow signals to said first and second counter means.

35. The apparatus of claim 34 in which said octant determining means includes means for providing a signal in accordance with the octant in which said vector being drawn lies for controlling said direction of count control means to control the counting directions of said first and second counter means.

36. The apparatus of claim 28 in which
said slope accumulator means includes means for providing a digital accumulated slope signal in accordance with the accumulated value of said slope signal, and
said second digital-to-analog converter means includes a plurality of digital bit inputs, the most significant bit inputs thereof being responsive to said second digital count signal and the least significant bit inputs thereof being responsive to said digital accumulated slope signal,
whereby the resolution of said display apparatus is enhanced.

37. Digital stroke display apparatus having display tube means with a display face and writing means positionable along X and Y display axes for writing vectors with predetermined slopes on said display face comprising
a source of clock pulses,
first counter means coupled to receive said clock pulses for counting said clock pulses and providing a first digital count signal in accordance therewith,
first positioning means responsive to said first digital count signal and coupled to said writing means for positioning said writing means along one of said axes in accordance with said first digital count signal at a first rate,
means for providing a slope signal representative of said slope,
multiplying means responsive to said clock pulses and to said slope signal for providing further clock pulses representative of the product therebetween,
second counter means for counting said further clock pulses and providing a second digital count signal in accordance therewith,
second positioning means responsive to said second digital count signal and coupled to said writing means for positioning said writing means along the other of said axes in accordance with said second digital count signal at a rate proportional to the product of said slope and said first rate,
said tube means comprising cathode ray tube means having a beam and X and Y deflection means for deflecting said beam along said X and Y axes respectively,
said first positioning means comprising
first digital-to-analog converter means responsive to said first digital count signal and coupled to one of said X and Y deflection means for providing a beam deflection signal thereto,
said multiplying means comprising slope accumulator means responsive to said slope signal and to said clock pulses for accumulating the value of said slope signal in response to said clock pulses and for providing overflow signals upon accumulation of a predetermined value thereby providing said further clock pulses, said second counter means comprising means for counting said overflow signals and providing said second digital count signal in accordance therewith, said second positioning means comprising second digital-to-analog converter means responsive to said second digital count signal and coupled to the other of said X and Y deflection means for providing a beam deflection signal thereto, said slope accumulator means including means for providing a digital accumulated slope signal in accordance with the accumulated value of said slope signal, and said second digital-to-analog converter means including a plurality of digital bit inputs, the most significant bit inputs thereof being responsive to said second digital count signal and the least significant bit inputs thereof being responsive to said digital accumulated slope signal, whereby the resolution of said display apparatus is enhanced.

38. Digital stroke display apparatus having cathode ray tube means with a display face and a beam for selectively writing vectors with predetermined slopes, circular curves with predetermined curvatures, said circular curves comprising a series of concatenated vectors, and characters on said display face, said cathode ray tube means having X and Y deflection means for deflecting said beam along X and Y axes respectively, comprising a source of clock pulses, a first up/down counter coupled to receive said clock pulses for counting said clock pulses and providing a first digital count signal in accordance therewith, a first digital-to-analog converter responsive to said first digital count signal and coupled to one of said X and Y deflection means for providing a beam deflection signal thereto, whereby said beam is deflected along one of said axes at a first writing rate, means for providing a slope signal representative of said slope, a slope add/subtract accumulator responsive to said slope signal and to said clock pulses for accumulating the value of said slope signal in response to said clock pulses and for providing overflow signals upon accumulation of a predetermined value, a second up/down counter for counting said overflow signals and providing a second digital count signal in accordance therewith, a second digital-to-analog converter responsive to said second digital count signal and coupled to the other of said X and Y deflection means for providing a beam deflection signal thereto, whereby said beam is deflected along the other of said axes at a rate proportional to the product of said slope and said first writing rate, wherein said means for providing a slope signal comprises means for providing a vector slope signal for writing said vectors, a slope memory for storing a plurality of slope values corresponding to said series of concatenated vectors respectively for writing circular curves, and a slope multiplexer for selectively coupling said means for providing a vector slope signal and said slope memory to said slope accumulator in accordance with whether vectors or circular curves are being written.

39. The apparatus of claim 38 further including length and curvature arithmetic means responsive to said clock pulses for selectively functioning as a length down counter and as an add/subtract curvature accumulator in accordance with whether vectors or circular curves are being written respectively, means for providing a length signal in accordance with the length of a vector to be written, means for providing a curvature signal in accordance with the curvature of a circular curve to be written, and a length and curvature multiplexer for selectively coupling said length signal and said curvature signal to said length and curvature arithmetic means in accordance with whether a vector or a circular curve is being written.

40. The apparatus of claim 39 further including gating means responsive to said overflow signals and said clock pulses for gating said clock pulses to said second up/down counter in response to said overflow signals thereby generating said second digital count signal, and clock control means for controlling the transmission of said clock pulses to said first and second up/down counters, to said slope accumulator and to said gating means.

41. The apparatus of claim 40 in which said length down counter comprises means for storing said length signal and for decrementing said length signal in accordance with said clock pulses until said signal is reduced to zero and for providing an end of vector signal to said clock control means for controlling the transmission of said clock pulses to said first and second up/down counters, to said slope accumulator and to said gating means.

42. The apparatus of claim 41 in which said curvature accumulator comprises means for accumulating said curvature signal and providing a digital address signal to said slope memory in accordance with the accumulated value thereof for addressing said plurality of slope values stored therein thereby providing said slope signal to said slope accumulator when a circular curve is being generated.

43. The apparatus of claim 42 further including clock switching means responsive to said clock pulses and said overflow signals and coupled to said first and second up/down counters for selectively interchanging the application of said clock pulses and said overflow signals to said first and second counters, direction of count control means for controlling the counting directions of said first and second up/down counters, and arithmetic function control means for controlling the function performed by said length and curvature arithmetic means and for selecting the additive and subtractive functions performed by said slope and curvature accumulators.

44. The apparatus of claim 43 further including an octant counter for providing a signal in accordance with the octant in which the vector being drawn lies for controlling said clock switching means and said direction of count control means.

45. The apparatus of claim 44 further including character memory means for storing short vector control signals including short vector length and slope signals for providing said short vector length signal to said length and curvature multiplexer and for providing said short vector slope signal to said slope multiplexer.

46. The apparatus of claim 45 further including a character memory address counter for providing sequential address signals to said character memory thereby sequentially providing short vector data to said apparatus for generating said characters.

47. Digital stroke display apparatus having cathode ray tube means with a display face and a beam for selectively writing vectors with predetermined slopes, circular curves with predetermined curvatures, said circular curves comprising a series of concatenated vectors, and characters on said display face, said cathode ray tube means having X and Y deflection means for deflecting said beam along X and Y axes respectively, comprising
   a source of clock pulses,
   a first up/down counter coupled to receive said clock pulses for counting said clock pulses and providing a first digital count signal in accordance therewith,
   a first digital-to-analog converter responsive to said first digital count signal and coupled to one of said X and Y deflection means for providing a beam deflection signal thereto,
   whereby said beam is deflected along one of said axes at a first writing rate,
   means for providing a slope signal representative of said slope,
   a slope add/subtract accumulator responsive to said slope signal and to said clock pulses for accumulating the value of said slope signal in response to said clock pulses and for providing overflow signals upon accumulation of a predetermined value,
   a second up/down counter for counting said overflow signals and providing a second digital count signal in accordance therewith,
   a second digital-to-analog converter responsive to said second digital count signal and coupled to the other of said X and Y deflection means for providing a beam deflection signal thereto,
   whereby said beam is deflected along the other of said axes at a rate proportional to the product of said slope and said first writing rate,
   said slope accumulator including means for providing a digital accumulated slope signal in accordance with the accumulated value of said slope signal and
   said second digital-to-analog converter including a plurality of digital bit inputs, the most significant bit inputs thereof being responsive to said second digital count signal and the least significant bit inputs thereof being responsive to said digital accumulated slope signal,
   whereby the resolution of said display apparatus is enhanced.

48. Digital stroke display apparatus having cathode ray tube means with a display face and a beam for selectively writing vectors with predetermined slopes, circular curves with predetermined curvatures, said circular curves comprising a series of concatenated vectors, and characters on said display face, said cathode ray tube means having X and Y deflection means for deflecting said beam along X and Y axes respectively, comprising
   a source of clock pulses,
   a first up/down counter coupled to receive said clock pulses for counting said clock pulses and providing a first digital count signal in accordance therewith,
   a first digital-to-analog converter responsive to said first digital count signal and coupled to one of said X and Y deflection means for providing a beam deflection signal thereto,
   whereby said beam is deflected along one of said axes at a first writing rate,
   means for providing a slope signal representative of said slope,
   a slope add/subtract accumulator responsive to said slope signal and to said clock pulses for accumulating the value of said slope signal in response to said clock pulses and for providing overflow signals upon accumulation of a predetermined value,
   a second up/down counter for counting said overflow signals and providing a second digital count signal in accordance therewith,
   a second digital-to-analog converter responsive to said second digital count signal and coupled to the other of said X and Y deflection means for providing a beam deflection signal thereto,
   whereby said beam is deflected along the other of said axes at a rate proportional to the product of said slope and said first writing rate,
   said slope accumulator including means for providing a digital accumulated slope signal in accordance with the accumulated value of said slope signal,
   said first digital-to-analog converter including a plurality of digital bit inputs, the most significant bit inputs thereof being responsive to said first digital count signal,
   said second digital-to-analog converter including a plurality of digital bit inputs, the most significant bit inputs thereof being responsive to said second digital count signal,
   said apparatus further including gating means for selectively applying said digital accumulated slope signal to the least significant bit inputs of said first and second digital-to-analog converters in accordance with the octant in which the vector being generated lies,
   whereby the resolution of said display apparatus is enhanced.

49. The apparatus of claim 48 including further gating means for coupling said digital accumulated slope signal to said first gating means for reversing the apparent accumulation direction of said slope accumulator.

* * * * *